(12) United States Patent
Merka et al.

(10) Patent No.: US 11,046,347 B2
(45) Date of Patent: Jun. 29, 2021

(54) MULTIPURPOSE WAGON

(71) Applicant: BURLEIGH WAGON PTY LTD., Robina (AU)

(72) Inventors: Nathan Merka, Robina (AU); Regan Merka, Robina (AU)

(73) Assignee: Burleigh Wagon Pty. Ltd., Robina (AU)

( * ) Notice: Subject to any disclaimer, the term of this patent is extended or adjusted under 35 U.S.C. 154(b) by 30 days.

(21) Appl. No.: 16/694,788

(22) Filed: Nov. 25, 2019

(65) Prior Publication Data
US 2020/0172141 A1 Jun. 4, 2020

(30) Foreign Application Priority Data
Nov. 30, 2018 (AU) .................................. 2018904559

(51) Int. Cl.
| | |
|---|---|
| *B62B 3/02* | (2006.01) |
| *B62B 5/06* | (2006.01) |
| *B62B 3/10* | (2006.01) |
| *B62B 5/08* | (2006.01) |

(52) U.S. Cl.
CPC .................. *B62B 5/06* (2013.01); *B62B 3/02* (2013.01); *B62B 3/104* (2013.01); *B62B 5/082* (2013.01)

(58) Field of Classification Search
CPC .. B62B 3/02; B62B 5/06; B62B 3/104; B62B 5/082
See application file for complete search history.

(56) References Cited

U.S. PATENT DOCUMENTS

| | | | | |
|---|---|---|---|---|
| 5,360,222 A | * | 11/1994 | Bro ......................... | B62B 5/082 280/47.34 |
| 5,538,267 A | * | 7/1996 | Pasin .................... | A63H 33/003 280/47.35 |
| 6,220,611 B1 | * | 4/2001 | Shapiro ................... | B62B 3/007 280/47.34 |
| 7,487,977 B2 | * | 2/2009 | Johnson .................. | B62B 3/007 280/47.34 |

(Continued)

*Primary Examiner* — John D Walters
*Assistant Examiner* — James J Triggs
(74) *Attorney, Agent, or Firm* — Fay Sharpe LLP

(57) ABSTRACT

The present invention relates in general to a multipurpose wagon. The multipurpose wagon has a wagon body having an upstanding perimeter wall defined by a bottom portion, a front portion, a rear portion, a first side portion and a second side portion. A rear wheel assembly is rotatably coupled to the bottom portion and located adjacent the rear portion of the body and a front wheel assembly is pivotally and rotatably coupled to the bottom portion and located adjacent the front portion of the body. A handle assembly is pivotally coupled to the front wheel assembly. A passenger compartment is defined within the upstanding perimeter wall and has a planar floor. A first seating surface is defined in the planar floor and extends from the rear portion of the wagon. A storage compartment is located beneath the passenger compartment. A second seating surface is removably coupled to the planar floor over the storage compartment. The first side portion has a wall panel that is removable from the first side portion of the wagon body and connectable to the planar floor of the passenger compartment and located adjacent to the second side portion of the wagon body.

20 Claims, 34 Drawing Sheets

(56) References Cited

U.S. PATENT DOCUMENTS

| | | | |
|---|---|---|---|
| 2008/0122191 A1* | 5/2008 | Johnson | B62B 7/04 |
| | | | 280/47.38 |
| 2012/0235372 A1* | 9/2012 | Herlitz | B62B 7/12 |
| | | | 280/47.38 |
| 2015/0084298 A1* | 3/2015 | Herlitz | B62B 3/02 |
| | | | 280/87.01 |
| 2017/0334474 A1* | 11/2017 | Bowman | B62B 3/1468 |

\* cited by examiner

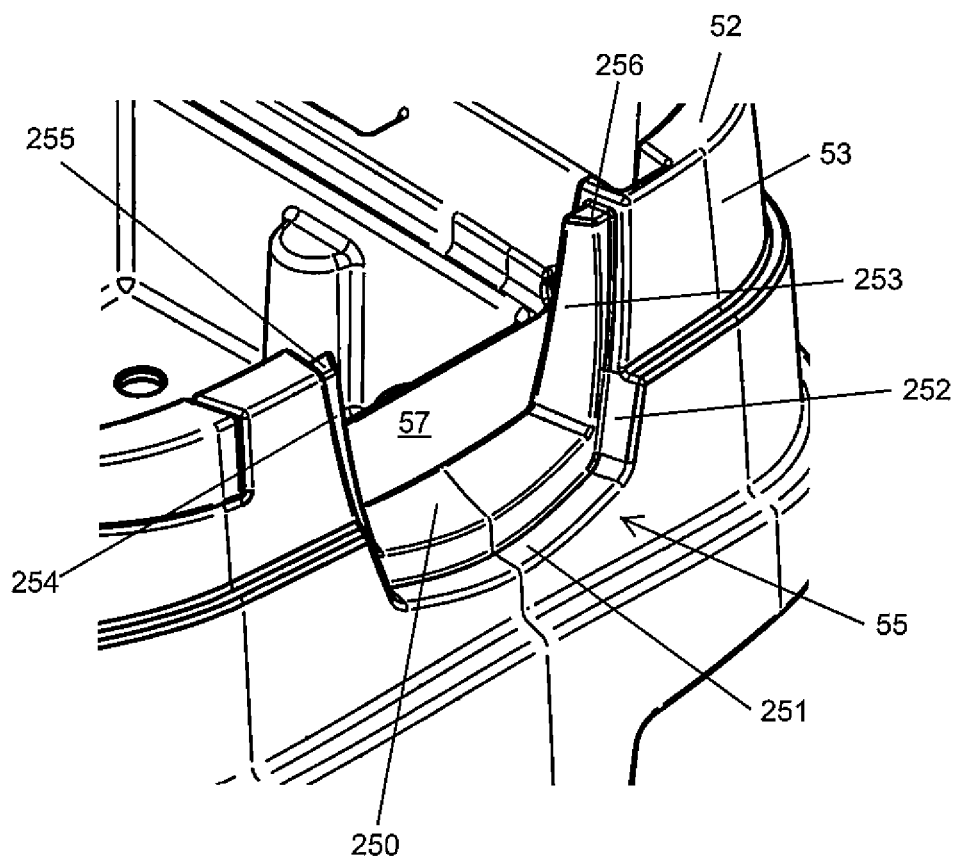
FIG. 30
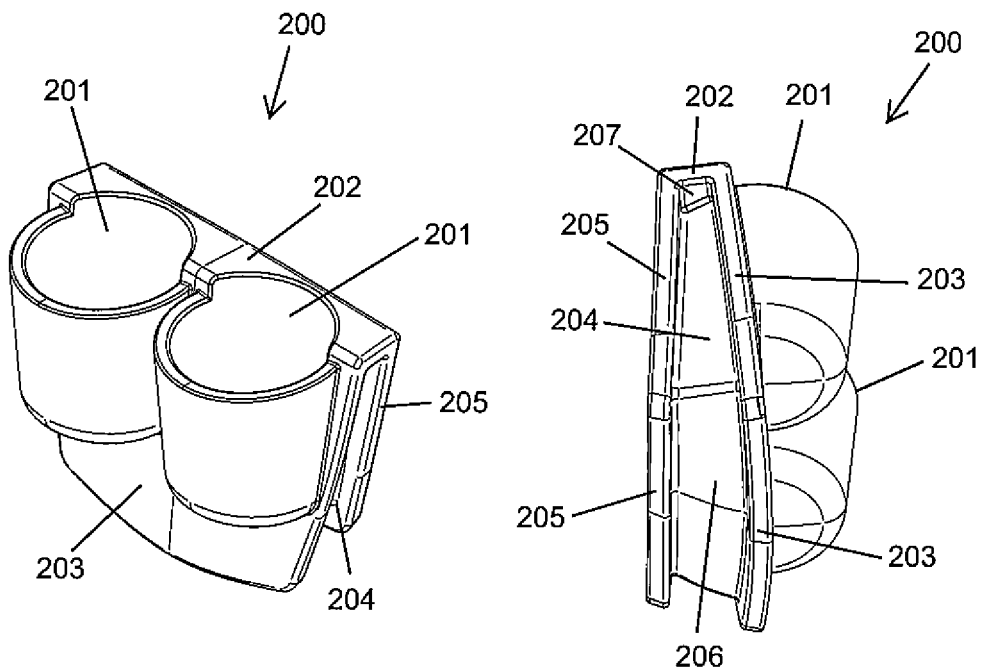
FIG. 31
FIG. 32

MULTIPURPOSE WAGON

This application claims priority to, and the benefit of, Australian Provisional Patent Application Serial No. 2018904559, entitled "Multipurpose Wagon," filed Nov. 30, 2018, the entirety of which is incorporated herein by reference.

FIELD OF THE INVENTION

The present invention relates generally to a multipurpose wagon. In particular, a wagon is provided with movable components that allow the wagon to be easily configured for carrying passengers, as a flatbed and for bench seating while providing storage and cargo carrying capacity.

The present invention also extends to a wagon for carrying children and a cooler for storing items in a temperature moderated climate.

BACKGROUND OF THE INVENTION

It should be noted that reference to the prior art herein is not to be taken as an acknowledgement that such prior art constitutes common general knowledge in the art.

Wheeled carts, such as wagons and toy ride-in vehicles, are well known for transporting children or supplies. Such wagons are well suited for travel over all types of surfaces including pavement, grass or sand. The typical wagon includes a body with a horizontal support surface or floor where a child may sit or cargo may be placed, upstanding side walls extending from and around the periphery of the horizontal supporting surface to prevent the child or cargo from falling out of the wagon. To provide rolling contact with the surface the wagon will have both front and rear wheel assemblies attached to the bottom of the body and a handle is attached to either the wagon body or the front wheel assembly to permit a user to steer and pull the wagon over the surface.

At one time, wagon bodies and handles were formed of wood, metal or combinations thereof. In recent times, however, wagon bodies and handles have been made from molded plastic, such as polyethylene or similar materials. Such wagons are becoming increasingly popular because of their light weight, durability, corrosion resistance, lower manufacturing cost and safety. The plastics material also provides for greater flexibility in terms of product design. For example, additional storage spaces, seating and other interior features may be molded into the wagon body and the body can be formed to any particular shape desired.

Existing wagons have a number of drawbacks. Many wagons and toy ride-in vehicles do not include a roof or a cover and therefore provide little or no protection for children or objects positioned within the wagon from sunlight or precipitation. Those wagons which include a cover or a roof typically are configured such that the cover or the roof is fixedly secured to the wagon. Furthermore, the fixed connection of the cover to the wagon often requires the use of tools in order to assemble or disassemble the cover from the wagon.

Flexible covers such as umbrellas have also been used to provide a cover for a wagon, but these also have a number of disadvantages. In particular, they require a central aperture or holding device to be located within the body to support the pole of the umbrella. The positioning of the umbrella can cause a loss of storage area and also poses an obstacle for the children within the wagon. They also tend to move around as the wagon is being pulled over the surface and are not very stable unless they are fixedly secured to the wagon.

Wagons have also been designed with removable side walls so that the wagon may be disassembled for transport or storage. A disadvantage of wagons with removable walls is that the removable panel, when not in use, must be stored. In additional to taking up storage space, it may become lost. Also, due to the removable nature of the design when the wagon is being pulled over a rough undulating surface the walls can vibrate and rattle. It has also been found that in some cases the walls can become detached during use and cause safety issues for the children travelling within the wagon. The better designs have a very complicated attachment mechanism which makes them very expensive and difficult to assemble and disassemble.

Removable side walls can also be utilized to allow the wagon to be converted to a bench seat. In some cases the detached sidewall must be stored or it will be lost. In other designs the detached sidewall is used as a rear support or back rest located on the fixed side wall. This requires some form of attachment means to secure the removable side wall to the fixed side wall. The attachment mechanism makes the wagon very expensive to make and in some cases difficult to assemble to form the bench seat.

Another problem associated with the known wagons is the positioning of the handle when the wagon is not being pulled over the surface. In most cases the handle is simply hinged or attached to either the front of the wagon or to the front wheel assembly. When the handle is attached to the front wheel assembly of the wagon, when not in use, the handle is simply dropped on the ground and can cause a tripping hazard.

Clearly it would be advantageous if a multipurpose wagon was designed which could be easily configured for carrying passengers, as a flatbed and for bench seating while providing storage and cargo carrying capacity and that helped to at least ameliorate some of the shortcomings described above. In particular, it would be beneficial if the multipurpose wagon could carry children under a cover which provided protection for children or objects positioned within the wagon from sunlight or precipitation and also had a cooler for storing items in a temperature moderated climate.

SUMMARY OF THE INVENTION

In accordance with a first aspect, the present invention provides a multipurpose wagon comprising: a wagon body having an upstanding perimeter wall defined by a bottom portion, a front portion, a rear portion, a first side portion and a second side portion; a rear wheel assembly rotatably coupled to the bottom portion and located adjacent the rear portion of the body; a front wheel assembly pivotally and rotatably coupled to the bottom portion and located adjacent the front portion of the body; a handle assembly pivotally coupled to the front wheel assembly, the handle assembly allowing a user to push or pull the wagon and rotate the front wheel assembly in an arc relative to the body to provide a steering effect to the wagon; a passenger compartment with a planar floor defined within the upstanding perimeter wall of the body; a first seating surface defined in the planar floor and extending from the rear portion of the wagon; a storage compartment with a planar base located beneath the passenger compartment, the storage compartment forming a first and a second discrete storage compartments separated by a partition wall upwardly extending from the planar base; a second seating surface removably coupled to the planar floor of the passenger compartment and located over the first storage compartment, the second seating surface being adapted for opening to provide access to the first storage compartment; a removable wall panel located within the first side portion of the body; and wherein the second storage compartment provides a foot well for a child or children seated on the first, second or both seating surfaces; and wherein when the removable wall panel is disconnected from the first side portion, the wall panel is repositioned to sit within respective apertures located in the planar floor of the passenger compartment and within the second side portion of the wagon body to form a backrest to support a child sitting within the wagon.

Preferably, the second storage compartment may be located between the first and second seating surfaces. The storage compartment may have a top edge with a ledge located therein and extending around a periphery of the storage compartment and located beneath the planar floor of the passenger compartment. The ledge may have a pair of apertures located within the opposing side walls and adjacent a front wall of the storage compartment, wherein the apertures are adapted to receive a locating member of the second seating surface.

Preferably, the partition may have a top edge with an aperture for receiving a side portion of the second seating surface therein.

Preferably, a plurality of mounting pads may be located around the periphery of the storage compartment, the mounting pads are adapted to receive a portion of the second seating surface thereon. The ledge and the mounting pads may be adapted to receive the second seating surface so that in use a top surface of the second seating surface sits flush with the planar floor of the passenger compartment.

Preferably, the second seating surface may further comprise an upper panel, a lower panel, and a pivot means mounted to one end of the upper panel to pivotally connect the lower panel to the upper panel, wherein in a folded position the upper panel and the lower panel are juxtaposed with each other. When the upper panel and the lower panel are juxtaposed with each other the second seating surface may be formed by locating the lower surface within the ledge and on the mounting pads of the first storage compartment and the upper surface sits flush with the planar floor of the passenger compartment. The upper panel may have a first end with a pair of locating tabs located on opposing sides of the upper panel, the locating tabs being received within the pair of apertures located within opposing side walls of the storage compartment. The locating tabs located within the pair of apertures may allow the second seating surface to be rotated to open and close the first storage compartment.

Preferably the pivot means located at one end of the second seating surface may be located within the aperture in the top edge of the partition of the storage compartment.

Alternatively, the second seating surface when the upper and lower panels may be pivoted to an expanded position, the upper and lower panels may be located in a common horizontal plane and form a planar surface with the floor of the passenger compartment. When the second seating surface is expanded, the second seating surface may be adapted to be inserted over the first and second storage compartments to form a flat-bed wagon. The upper panel may be received within the ledge surrounding the first storage compartment, the pivoting means is received within the aperture in the top edge of the partition, and the lower panel is received within the ledge surrounding the second storage compartment.

Preferably, the handle assembly may further comprise an outwardly extending elongate lever arm having a first end and a second end, the first end being pivotally coupled to the front wheel assembly, the second end having an opening configured for grasping by a person for pulling or pushing the multipurpose wagon.

Preferably, the front wheel assembly may further comprise: a housing with a top and a bottom surface; a first axle having a longitudinal axis coupled to the bottom surface of the housing; a wheel rotatably coupled to each end of the first axle; a boss extending from the top surface of the housing, the boss having an end secured within an opening in the planar base of the storage compartment; and a circular raised surface circumscribing the boss to allow the housing assembly to be pivoted relative to the bottom portion of the body around the boss.

Preferably, the handle assembly may be pivotally connected to the housing of the front wheel assembly.

Preferably, the rear wheel assembly may comprise: a second axle having a longitudinal axis coupled to the bottom portion at a junction defined by the bottom portion and the rear portion of the body; and a wheel rotatably coupled to each end of the second axle. Each wheel may be located within an indentation in the wagon body, the indentations defining wheel wells for substantially receiving each wheel therein.

Preferably, the second side portion may further comprise a door hingedly coupled to one of the side walls of the passenger compartment, the door being selectively movable between an open and a closed position.

Preferably, the passenger compartment defined within the upstanding perimeter wall may have a top surface extending around the perimeter of the wagon body. The top surface located within the second side portion may have a plurality of receiving slots adapted as engagement means for retaining objects to the wagon.

Preferably, one of the receiving slots may have a longitudinally extending socket extending from the top surface of the second side portion to approximately the bottom portion of the wagon body, the socket has a second slot extending outwardly from each side of the socket and running parallel to the top surface of the second side portion, the second receiving slot extending for a pre-determined distance from the top surface of the second side portion. The receiving slot may be adapted to receive a shaft of a collapsible umbrella and the second slot is adapted to receive a locking pin extending transversely through the shaft of the umbrella, the locking pin engaging with the second slot to prevent the rotation of the umbrella shaft within the receiving slot.

Preferably, the front portion of the passenger compartment may have a centrally located aperture for receiving a removable cup holder.

Preferably, the cup holder may comprise: a top wall with at least one receptacle for receiving a cup therein; a bottom wall and opposing side walls; and a recess formed around the bottom wall and opposing side walls. The aperture in the front portion may have a tab extending around the periphery of the aperture for receiving therein the recess formed around the bottom wall and the side walls of the cup holder.

Preferably, when the cup holder is removed from the aperture within the front portion a section of the handle assembly pivotally attached to the front wheel assembly of the wagon may be pivoted to a position substantially located above and over the planar floor of the passenger compartment.

Preferably, the removable panel may comprise a leading edge, a trailing edge, a top surface and a bottom surface.

Preferably, the removable panel may further comprise a tab extending from the bottom surface of the panel, the tab being received within a socket located within the first side portion of the wagon body.

Preferably, the front portion and the rear portion may each comprise a first side edge and a second side edge. The leading edge of the removable panel may have a first locating projection, the first locating projection is sized to be received within a socket located in the first side edge of the front portion, the trailing edge of the removable panel has a second locating projection, the second locating projection is sized to be received within a socket located in the first side edge of the rear portion.

Preferably, the planar floor of the passenger compartment may have an opening socket therein located adjacent and running parallel with the second side portion of the wagon. The opening socket may be sized and shaped to receive the tab extending from the bottom surface of the removable panel.

Preferably, when the removable panel is detached from the first side portion of the wagon and the tab extending from the bottom surface of the panel may be inserted into the opening socket of the planar floor of the passenger compartment on the second side portion, the leading edge of the removable panel and the first locating projection is inserted into a socket located in the second side edge of the rear portion and the trailing edge of the removable panel and the second locating projection is inserted into a socket located in the second side edge of the front portion.

Preferably, the first and second locating projections may be releasably friction fit within the sockets located in the first and second side edges of the front and rear portions. The tab of the removable panel may be friction fit within the opening socket of the planar floor of the passenger compartment and the socket located within the first side portion.

Preferably, the second side portion may have a first height in a first configuration of the wagon, and wherein the second side portion has a second height when the removable panel is connected to the opening adjacent the second side portion in a second configuration, the second height being greater than the first height.

Preferably, in the first configuration a flat-bed wagon or a bed wagon may be formed with the second seating surface opened to cover the first and the second storage compartments.

Preferably, a bench seat may be formed in the second configuration with the second seating surface opened to cover the first and the second storage compartments and the removable panel forms a backrest for the bench seat.

Preferably, the multipurpose wagon may be a child's wagon and in use the second storage compartment forms a foot well between the first and second seating surfaces and the planar base within the second compartment is positioned lower than the first and second seating surfaces. The child's feet may be positioned in the foot well while the first and/or second seating surface area provides support for the child sitting in the wagon.

Preferably, the planar floor or the front and rear portions of the passenger compartment may further comprise at least one socket therein, the socket being adapted for securing an end of a child restraining means to secure a child or children when seated in the first, second or both seating surfaces.

Alternatively, the passenger compartment may further comprise three sockets located within any one of the planar floor or the front and rear portions, each socket being adapted for securing an end of a child restraining means to secure a child or children when seated in the first, second or both seating surfaces.

Preferably, the first and second storage compartments may further comprise at least one aperture located within the planar base of each storage compartment, the at least one aperture being adapted to provide a drain for any built up water located within the first and second storage compartments.

Preferably, the first storage compartment may be configured as a cooler. The cooler may be an insulated compartment and the second seating surface is configured to sealably close a top of the insulated compartment. The insulated compartment may further comprise a drain plug configured to sealably close the at least one drain hole of the insulated compartment, and a drain cap located over the drain plug. The drain plug and drain cap may be located within the drain hole and accessible from the bottom portion of the wagon body.

Preferably, the removable panel may further comprise a device mounting means located on an internal surface of the panel. A wireless speaker may be attached to the device mounting means and one of the at least one sockets in the planar floor of the passenger compartment may be adapted to locate therein a mobile music device.

Preferably, an interior volume defined by the storage compartment may be smaller than an interior volume of the passenger compartment.

Preferably, the multipurpose wagon may further comprise a removable tray, the removable tray is releasably attached to the removable panel and the door. The removable tray may comprise: a longitudinally extending base; a pair of flanges extending downwardly from the base and between which the base is located; and a pair of tabs on each flange, each tab is adapted to releasably connect to a socket located on the removable panel and the door.

Preferably, the longitudinally extending base may have at least one cup holder and at least one storage compartment located therein.

Preferably, the wagon body, the front wheel assembly, the rear wheel assembly, the handle assembly, the second seating surface, the wheels and the removable tray may be made from a plastics material with channels molded therein. The components of the wagon may be produced using a rotational molding process. Preferably, the plastics material may be a low-density polyethylene (LDPE).

In accordance with a further aspect, the present invention provides a multipurpose wagon comprising: a wagon body having an upstanding perimeter wall defined by a bottom portion, a front portion, a rear portion, a first side portion and a second side portion; a rear wheel assembly rotatably coupled to the bottom portion and located adjacent the rear portion of the body; a front wheel assembly pivotally and rotatably coupled to the bottom portion and located adjacent the front portion of the body; a handle assembly pivotally coupled to the front wheel assembly, the handle assembly allowing a user to push or pull the wagon and rotate the front wheel assembly in an arc relative to the body to provide a steering effect to the wagon; a passenger compartment with a planar floor defined within the upstanding perimeter wall; a first seating surface defined within the passenger compartment and extending from the rear portion of the wagon; a storage compartment located beneath the passenger compartment; a second seating surface removably coupled over a section of the storage compartment, the second seating surface being adapted for opening to provide access to the storage compartment; and a removable wall panel located within the first side portion of the wagon body and when removed from the first side portion is connectable to a socket located within the planar floor of the passenger compartment and located adjacent to the second side portion of the wagon body.

Preferably, the multipurpose wagon may further comprise and any one of the features of the first aspect.

In accordance with a still further aspect, the present invention provides a multipurpose wagon comprising: a wagon body having an upstanding perimeter wall defined by a bottom portion, a front portion, a rear portion, a first side portion and a second side portion; a passenger compartment with a planar floor defined within the upstanding perimeter wall; a first seating surface defined in the planar floor and extending from the rear portion of the wagon body; a storage compartment located beneath the passenger compartment, the storage compartment having a planar base, a front wall, a back wall, opposing side walls and a partition upwardly extending from the base and interconnecting the opposing side walls to form a first and a second discrete storage compartment; a second seating surface removably coupled to the planar floor over the first storage compartment, the second seating surface being adapted for opening to provide access to the first storage compartment; a rear wheel assembly rotatably coupled to the bottom portion and located adjacent the rear portion of the body, the rear wheel assembly comprises a rear axle having a longitudinal axis coupled to the bottom portion at a junction defined by the bottom portion and the rear portion of the body, and a wheel rotatably coupled to each end of the rear axle; a front wheel assembly pivotally and rotatably coupled to the bottom portion and located adjacent the front portion of the body, the front wheel assembly comprises a housing with a top and a bottom surface, a front axle having a longitudinal axis coupled to the bottom surface of the housing, a wheel rotatably coupled to each end of the front axle, and a boss extending from the top surface of the housing, the boss having an end secured within an opening in the planar base of the storage compartment, and a circular raised surface circumscribing the boss to allow the housing assembly to be pivoted relative to the bottom portion of the body around the boss; a handle assembly pivotally coupled to the housing of the front wheel assembly to allow a user to push or pull the multipurpose wagon and rotate the front wheel assembly in an arc relative to the body to provide a steering effect to the wagon; a removable wall panel located within the first side portion of the wagon body, the removable panel when removed from the first side portion is connectable to a socket in the planar floor of the passenger compartment and located adjacent to the second side portion of the wagon body; and a removable cup holder located within a centrally located aperture of the front portion, when the cup holder is removed from the aperture within the front portion a section of the handle assembly pivotally attached to the front wheel assembly of the wagon can be pivoted to a position substantially located above and over the planar floor of the passenger compartment.

Preferably, the multipurpose wagon may further comprise any one of the features of the first aspect. Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIG. 30 shows an enlarged view of an aperture in the front wall of the wagon body;

FIGS. 31 and 32 show a perspective view and bottom view of the cup holder;

DETAILED DESCRIPTION OF THE PREFERRED EMBODIMENTS

Figure 1:
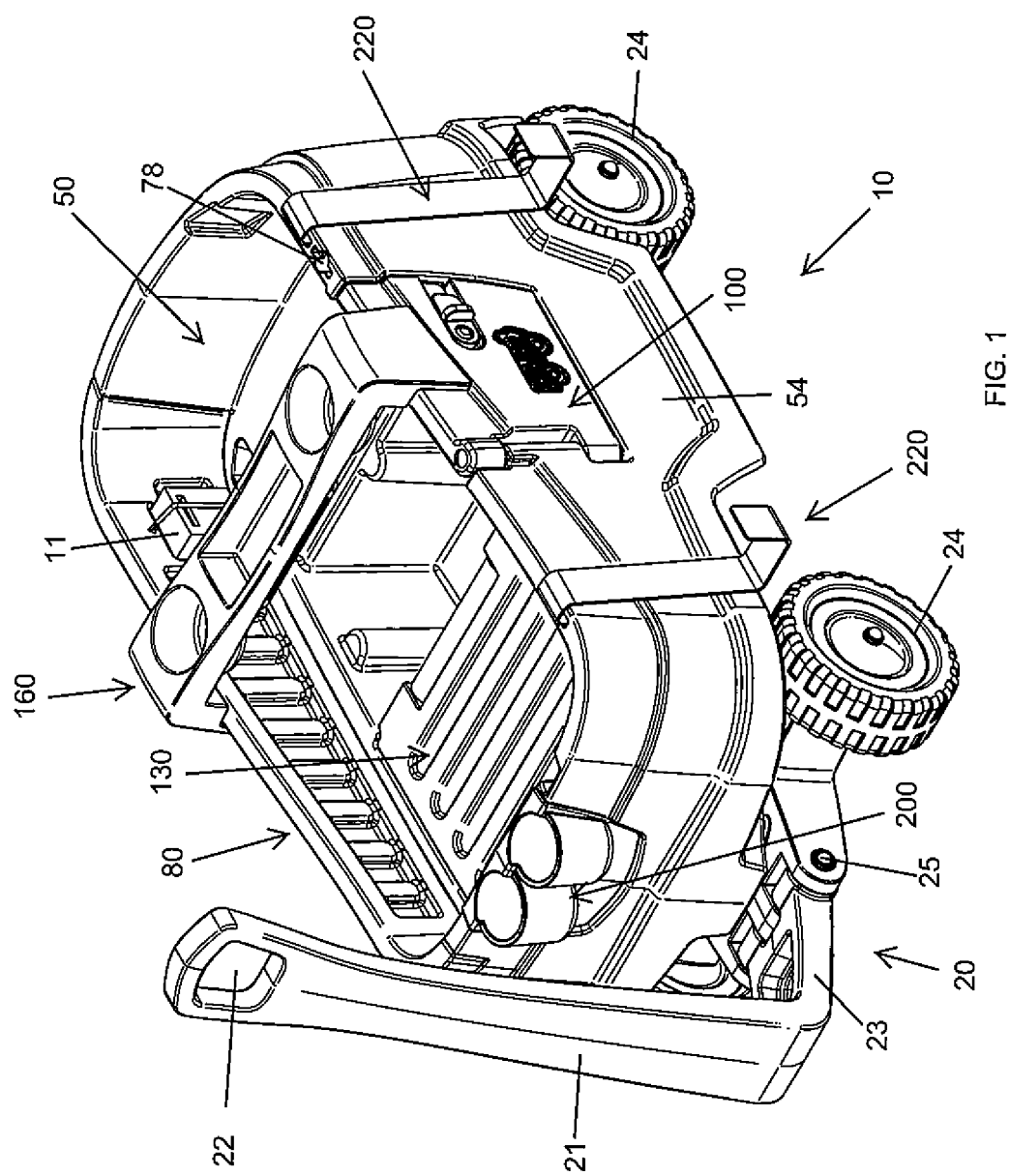
FIG. 1 shows a perspective view from the front of an embodiment of the multipurpose wagon of the present invention.

The following description, given by way of example only, is described in order to provide a more precise understanding of the subject matter of a preferred embodiment or embodiments.

The multipurpose wagon of the present invention is a designed product that can be used by children, adolescents and adults. By way of example only, the multipurpose wagon can be provided with configurable components to allow different uses of the multipurpose wagon. In one configuration, the multipurpose wagon may have one or two seats and a well for placement of feet, allowing passengers to comfortably ride in the multipurpose wagon. In another configuration, a seat may be folded down in flat position, allowing the wagon to be used as a flat-bed carrier with storage compartments below. Alternatively, in the same configuration the wagon can be used as a bed for a child. In yet another configuration, a panel may be removed from one side of the side walls of the multipurpose wagon and inserted into an opposing side floor of the multipurpose wagon, thereby acting as a backrest for a bench seating arrangement for the multipurpose wagon.

The present invention was designed to provide an alternative multipurpose wagon which could be used to transport children easily and safely over a variety of surfaces. The multipurpose wagon 10 consists of a wagon body 50 having an upstanding perimeter wall defined by a bottom portion, a front portion, a rear portion, a first side and a second side portions. The body is supported for rotation on a front wheel assembly 20 and a rear wheel assembly. A passenger compartment is defined within the upstanding perimeter wall. The passenger compartment consists of a planar floor 57, a front wall 56, a back wall 53, a first side wall 51 and a second side wall 54. A first seating surface is defined in the planar floor 57 and extending from the rear portion of the back wall 53 of the wagon body 50. Storage compartments 58, 59 are located beneath the passenger compartment. The storage compartments have a first compartment 58 and a second compartment 59 with a base 63, 64, opposing side walls and a partition wall 60 separating the two storage compartments 58, 59. A second seating surface 130 is removably coupled to the planar floor 57 over the first storage compartment 58 to provide a second seat. The second seating surface 130 being adapted to open and close the first storage compartment 58. In use, the second storage compartment 59 provides a foot well for a child seated in either the first, second or both seating surfaces. A removable panel 80 is located within the first side wall 51 and when removed from the first side wall the panel 80 is inserted into a socket located in the planar floor 57 of the passenger compartment and located adjacent to the second side wall 54.

A wagon constructed in accordance with the present invention is illustrated in FIG. 1. The wagon 10 has a body 50, a front wheel assembly 20, a removable panel 80 is located within a side wall 51 and an access door 100 is located in the opposing side wall 54. Removably attached over the top of the body is an accessory tray 160 which can be utilized as a drink holder or further storage compartment. Alternatively, the wagon 10 can also be used to transport pets and when used for this purpose the accessory tray 160 can be used for feed and water bowls for the animal. Attached to the interior side of the removable panel 80 is a wireless or Bluetooth speaker 11 which can be used to play music stored on an electronic device such as a mobile phone (not shown). The speaker 11 may also have USB charging ports to allow a user to charge electronic devices while at the beach or at an outing. Storage compartments 58, 59 are located beneath the passenger compartment and have one side covered by the seating surface 130 and an open side which can be utilized as a foot well. A drink holder 200 is removably located within the front wall 56 of the wagon body 50. As will be illustrated below the cup holder 200 can be removed allowing the handle assembly 21, 22, 23 to be pivoted and positioned over the planar floor 57 of the passenger compartment.

Mounted in sockets 77 located on the top surface 52 of the side wall 54 are the pair of brackets 220 which can be utilized for carrying an accessory such as a surfboard (not shown). Alternatively, other accessories could be stored on the brackets 220. For example, a collapsible picnic table or the umbrella 260 when not being used could also be stored on the brackets 220. Also shown in FIG. 1 is the socket 78 which as will be described below can be utilized for the placement of an umbrella 260 for providing shade and protection from precipitation for children and items which are positioned within the passenger compartment of the wagon 10. The seat 130 is located within a recess of the planar floor 57 and above the first storage compartment 58. The wagon body 50 is mounted for rotation upon a front wheel assembly 20 and the rear wheel assembly. The front wheel assembly 20 consists of the wheels 24 mounted on a longitudinally extending axle which is attached to the housing and pivotally mounted to the underside of the body 50. The rear wheel assembly consists of a rear axle attached to the underside of the body 50 at the junction of the rear wall 53. At either end of the rear axle 36 are the wheels 24 mounted for rotation. A handle assembly 21, 22, 23 is pivotally attached at the front of the housing by the pin 25. The handle assembly has a first arm 23 and a second arm 21 extending approximately perpendicular from the first arm 23. The first end of the arm 23 is attached to the pin 25 and the distal end of the arm 21 has an opening 22 which allows a user to grasp the handle 21 to push or pull the multipurpose wagon 10.

Wagon body 50 includes a front seat 130 located in the front portion of the wagon body 50 and interior of the front wall 56, a rear seat forming part of the planar floor 57 and located in the rear portion of the wagon body 50 and adjacent the rear wall 53, a cavity or well 59 and a floor 63, allowing two passengers to comfortably sit in the multipurpose wagon 10. For example, two passengers (e.g. children) can sit in the multipurpose wagon 10, one passenger facing rearwards while seated on front seat 130 and the other passenger facing forward while seated on the rear seat. Both passengers' legs may extend into foot well or cavity 59 that is located between the front seat 130 and the rear seat, and either or both passengers' feet may rest on floor 63, wherein the floor 63 is positioned lower than the front seat 130 surface and the rear seat surface and the floor 57 of the passenger compartment. Thus, passengers may sit in the multipurpose wagon 10 as they would typically sit in a chair, eliminating the need to sit cross-legged on a wagon floor.

Figure 2:
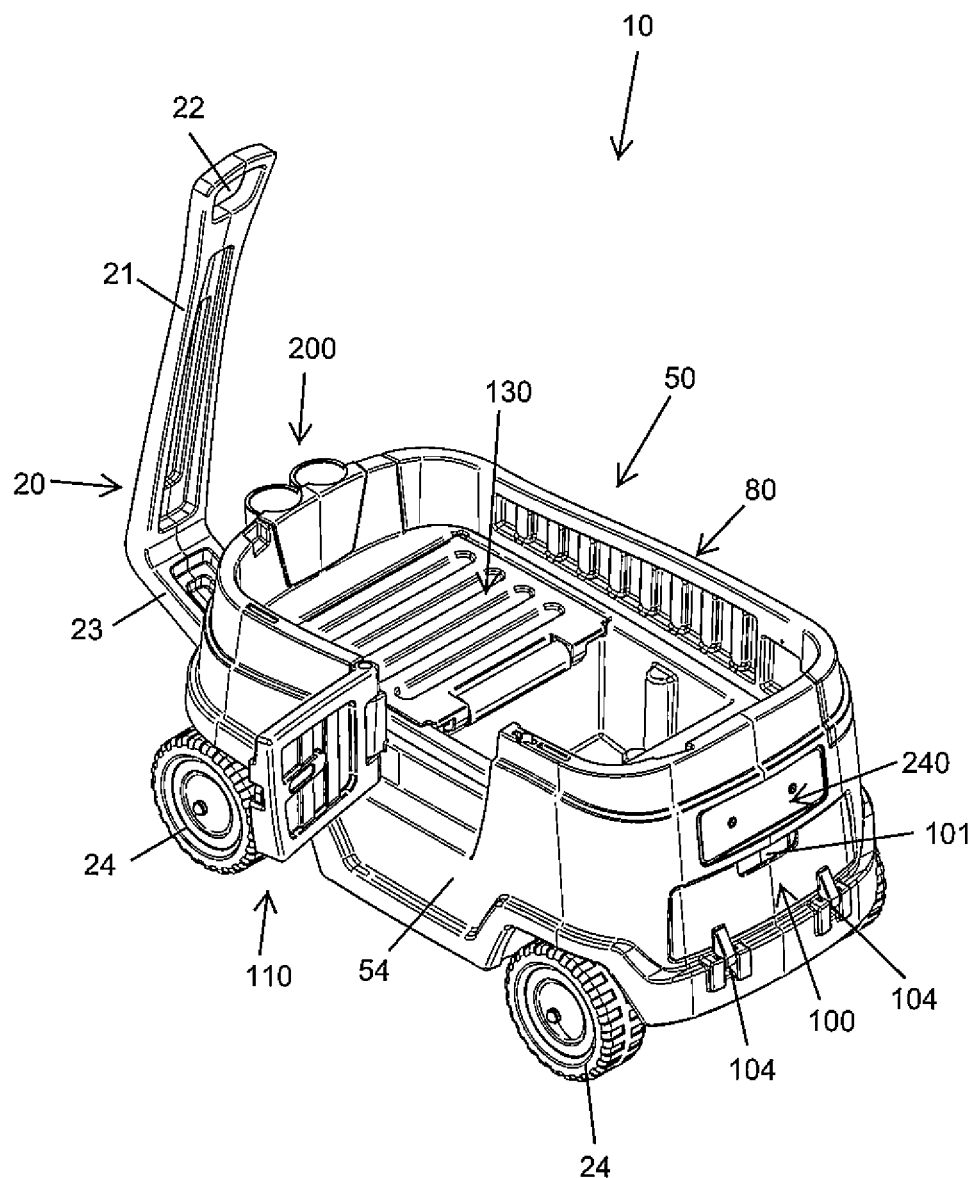
FIG. 2 shows a perspective view from the rear of the wagon of FIG. 1 showing the access door in an open configuration.
Figure 3:
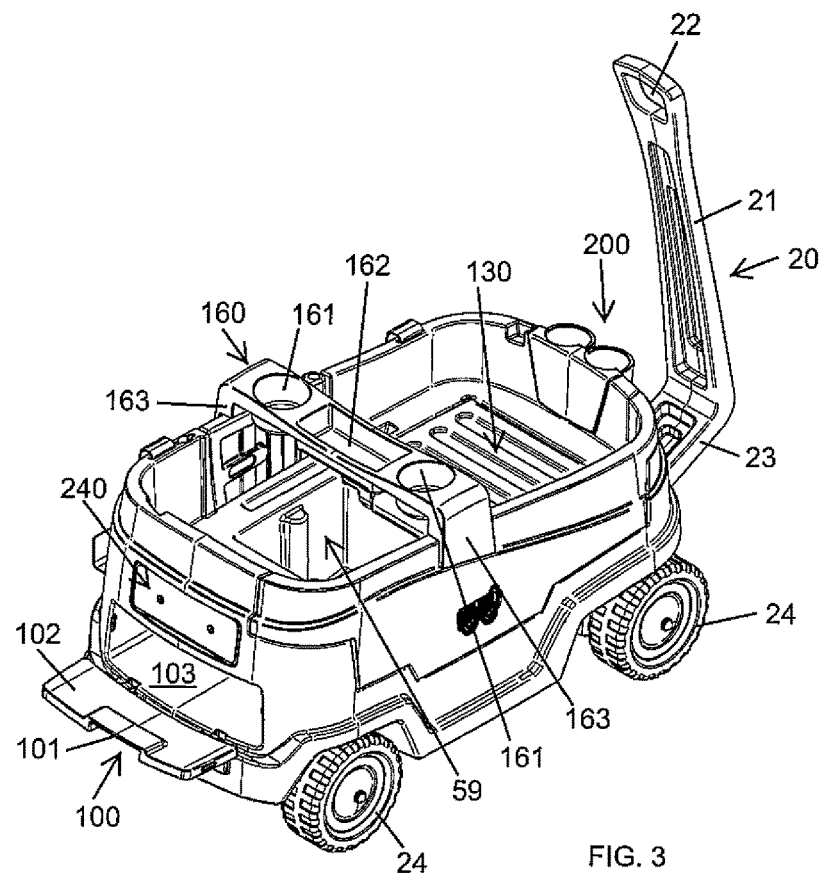
FIGS. 3 and 4 show a perspective view and a rear side view from the rear of the wagon of FIG. 1 with the trunk in the open position.
Figure 4:
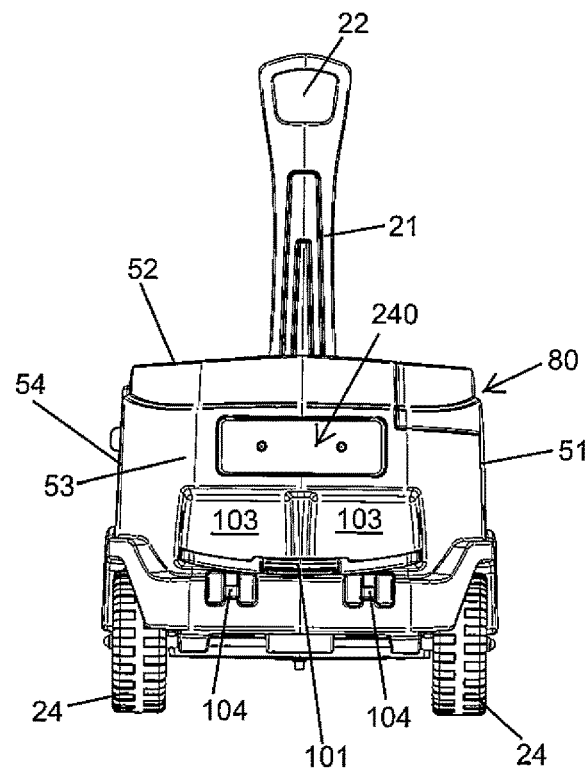

FIG. 2 shows the multipurpose wagon 10 with the accessory tray 160 removed for clarity of the underlying components. FIGS. 2 to 4 also show the access door 110 open to allow access to the passenger compartment. A rear door 100 is pivotally connected to the rear wall 53 at the pivot points 104. The rear door 100 is rotated around the pivot points 104 to allow access to the interior storage compartments 103 in a similar way as would be utilized for the trunk of an automobile. The door 100 has a recessed gripping portion 101 which allows the user to easily open and close the door 100. Located above the door 100 is a number plate mounting recess 240 to which a user may mount a customized number plate. The number plate recess 240 is adapted to allow an aluminum composite panel or the like with letters, numbers and/or images printed on one surface of the plate to be mounted within the recess 240. Typically, the number plate mounted in the recess 240 would have a UV over laminate coating applied over the surface of the printed characters to provide protection from the weather, UV radiation and physical damage. Alternatively, the number plate mounted in the recess 240 may be a plastic plate such as a polyvinyl chloride (PVC) or acrylic plate.

FIG. 3 shows the accessory tray 160 which has a longitudinally extending base and a pair of flanges 163 extending downwardly from the base. As illustrated the base has two circular molded recesses or cup holders 161 and a central rectangular molded storage compartment 162. The accessory tray 160 utilizes a snap fit connection to connect each flange 163 to a socket located in the side wall 51 and in the access door 110.

Figure 5:
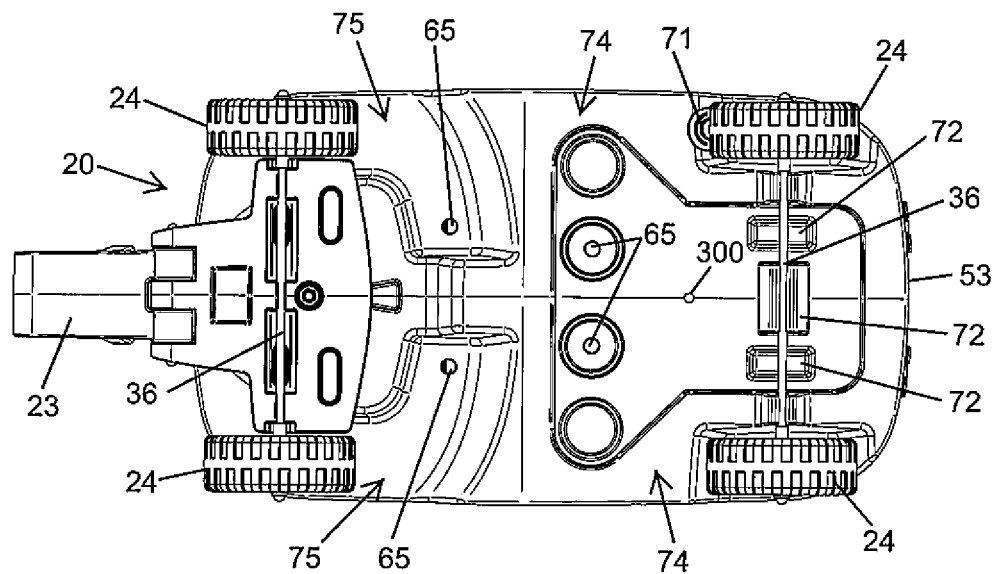
FIG. 5 shows a bottom view of the multipurpose wagon of FIG. 1.
Figure 6:
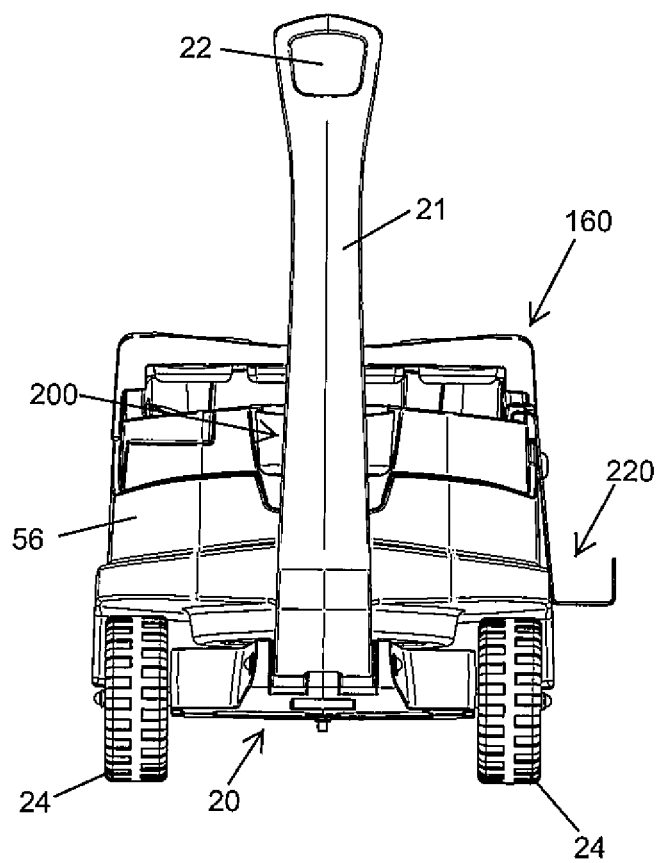
FIG. 6 shows a front view of the multipurpose wagon of FIG. 1.

FIG. 5 shows a bottom view of the multipurpose wagon 10 showing a molded base having a first end 74 which houses the rear wheel assembly and a second end 75 which houses the front wheel assembly 20. The longitudinal rear axle 36 of the rear wheel assembly is mounted within three mounting blocks 72 and a wheel 24 is mounted on either end of the axle 36. Located in the first end 74 and substantially under the second storage compartment 59 are two drainage holes 65 which allow any water which is retained within the storage compartment 59 to drain from within. Each drain hole 65 may contain a plug and cap (not shown) to allow any water to be drained when the cap is removed from the plug. The plug and cap being mounted to allow access from the bottom of the wagon body 50. Also illustrated in FIG. 5 in the first end 74 is the bottom 71 of the socket 78 which is utilized for receiving the shaft of the umbrella 260. The bottom 71 closes off the socket 78 and is located within one of the wheel wells or indentations to which the wheels 24 are mounted for rotation. The front wheel assembly 20 also consists of an axle 36 mounted to the bottom of a housing with wheels 24 mounted to either end of the axle 36. FIG. 5 also shows the body 50 with drain hole 300, the drain hole 300 allows any water which may settle within the body 50 of the wagon 10 to drain therefrom.

Figure 7:
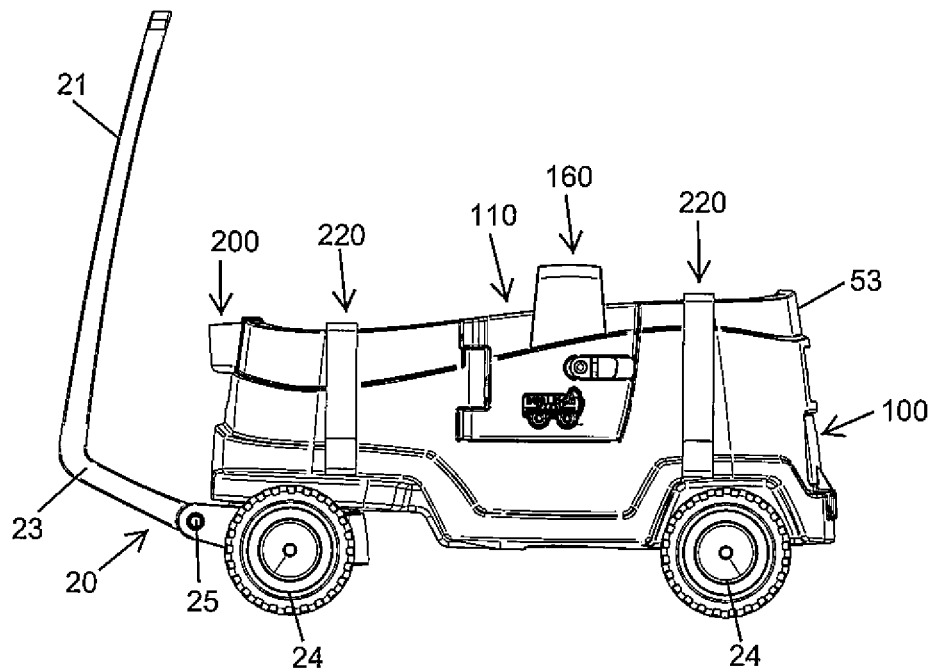
FIGS. 7 and 8 show left and right side views of the multipurpose wagon of FIG. 1.
Figure 8:
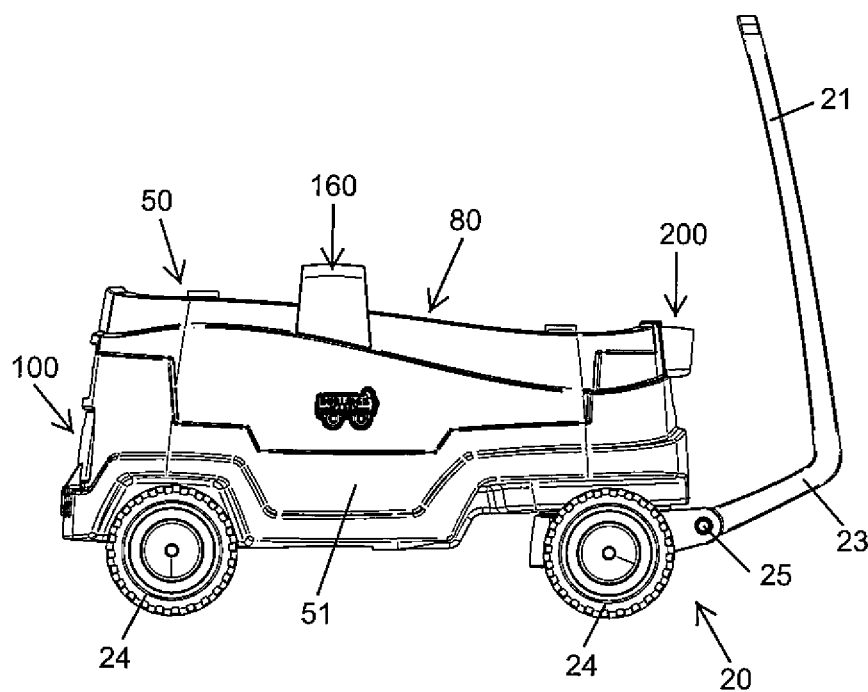
Figure 9:
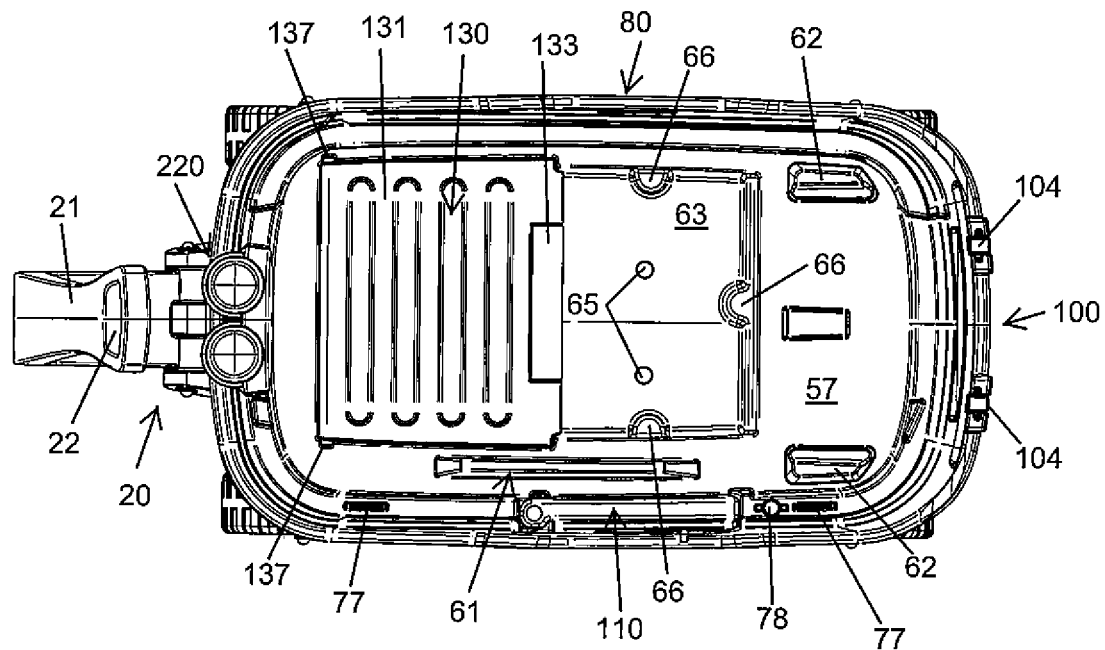
FIG. 9 shows a top view of the multipurpose wagon of FIG. 1.

FIGS. 7 and 8 show both side views of the multipurpose wagon 10. FIG. 7 illustrates the position of the access door 110 with the accessory tray 160 mounted to the door 110. FIG. 8 shows the opposite side view with the removable panel 80 mounted within the side wall 51 of the body 50 of the multipurpose wagon 10. FIG. 9 shows a first orientation of the seating member 130 when positioned in place over the first storage compartment 58. In this orientation the multipurpose wagon 10 is configured to allow two children to be seated within the passenger compartment. A first child can be seated on the planar floor 57 located adjacent the rear wall 53 with the child's feet supported upon the base 63 of the second storage compartment 59. Also located within the planar floor section 57 are the recesses 62 which are designed to receive mounting assemblies for a seatbelt harness (not shown) for retaining the child while the multipurpose wagon 10 is being moved over a surface. A second child can be seated on the upper surface 131 with the seating surface 130 mounted above the first storage compartment 58. A seatbelt or harness is also positioned within the area surrounding the front of the first storage compartment 58 for releasably retaining the child seated therein. The upper seating panel 131 upon which the child would be seated has a pair of tabs 137 which are pivotally located within a recess located at the front edge of the first storage compartment 58 and adjacent the planar floor 57. The tabs 137 allow the seating surface 130 to be pivoted between open and closed positions to allow a user to access the storage compartment 58 located beneath the seating surface 130. Also evident from the top view are the drain holes 65 in the base 63 of the second storage compartment 59. Located around the periphery of the second storage compartment 59 and located below the planar floor 57 are the mounting pads 66 which will be described in further detail below. Located adjacent and running parallel with the side wall 54 is the opening socket 61 which is utilized to receive the bottom tab of the removable panel 80 when the multipurpose wagon 10 is used as a bench seat. Also shown on the top surface 52 of the side wall 54 is the accessory mounting sockets 77 and 78.

Figure 10:
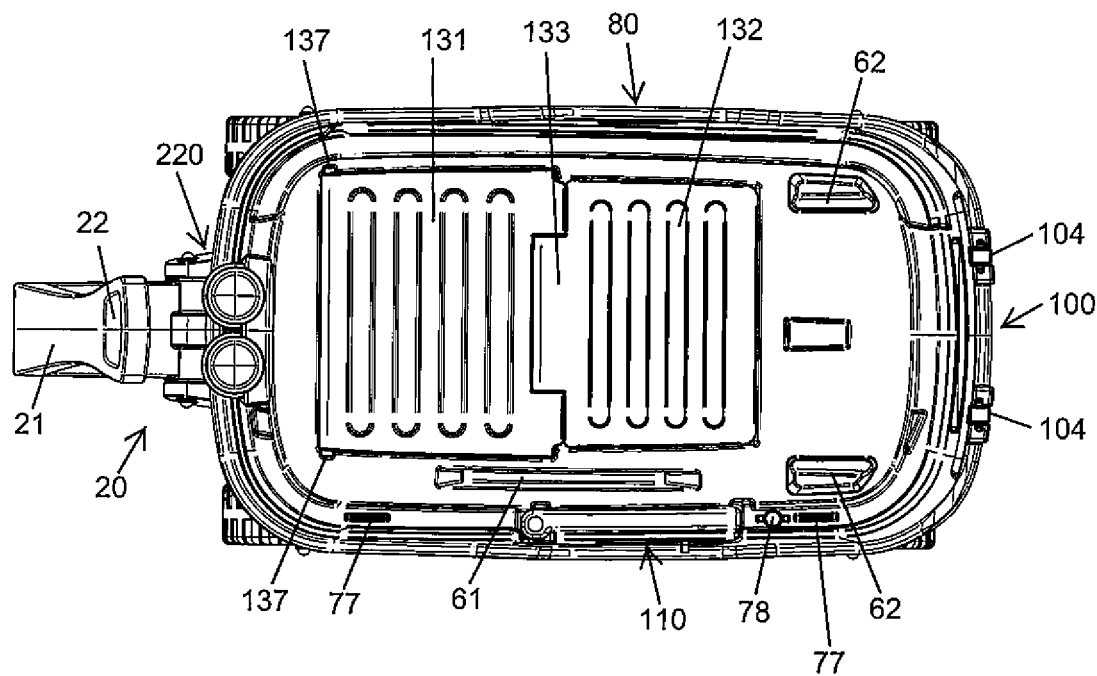
FIG. 10 shows a further top view of the multipurpose wagon in a further configuration of a flat top wagon with the seat covering the storage compartment in accordance with a further embodiment of the present invention.

FIG. 10 shows a second orientation of the seating member 130 when positioned in place over both the first and second storage compartments 58, 59. In this orientation the multipurpose wagon 10 can be used as a flat-bed wagon or alternatively a mattress (not shown) can be inserted to provide a bed for a child. As described above in this configuration the wagon 10 can also be used to contain an animal therein. The animal may be tethered to the seating harnesses or some other attachment mechanism to secure and retain the animal within the passenger compartment. The upper panel 131 is mounted within a recess in the planar floor 57 and the tabs 137 are pivotally retained within the recesses located towards the front wall 56. The upper panel 131 covers the first storage compartment 58. The lower panel 132 is attached to the upper panel 131 by the pivot 133. The lower panel 132 is located within the recess in the planar floor 57 around the second storage compartment 59. The underside of the panels 131, 132 are supported upon the mounting pads 66 such that the top surface of the panels 131, 132 sits flush with the planar floor 57. The underside of the pivot 133 is also supported upon a surface within an aperture in the partition 60. In this configuration the top surfaces of the panels 131, 132 and the planar floor 57 of the passenger compartment form a substantially planar surface within the upstanding perimeter wall of the wagon 10.

Figure 11:
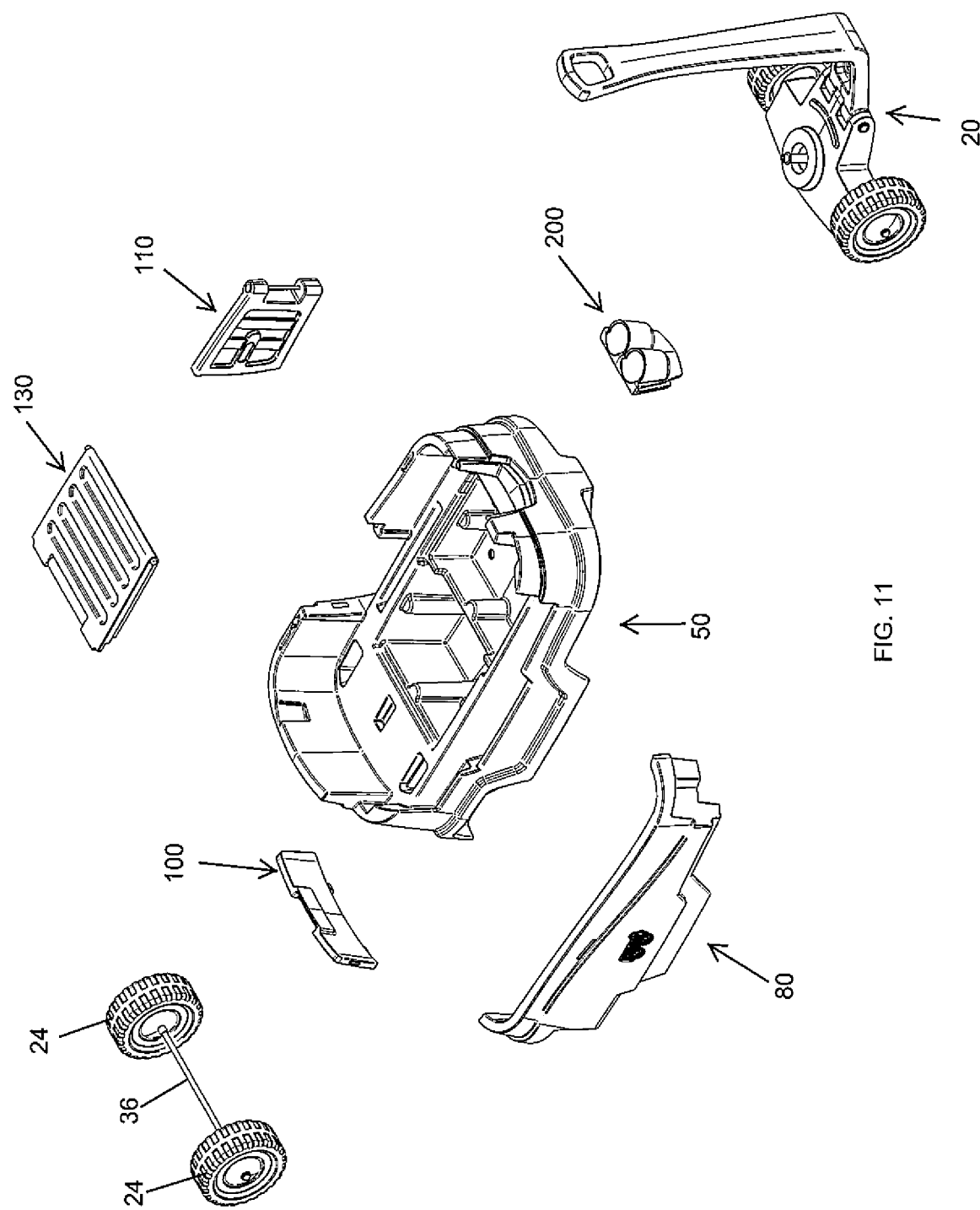
FIG. 11 shows an exploded perspective view of the multipurpose wagon of FIG. 1.
Figure 12:
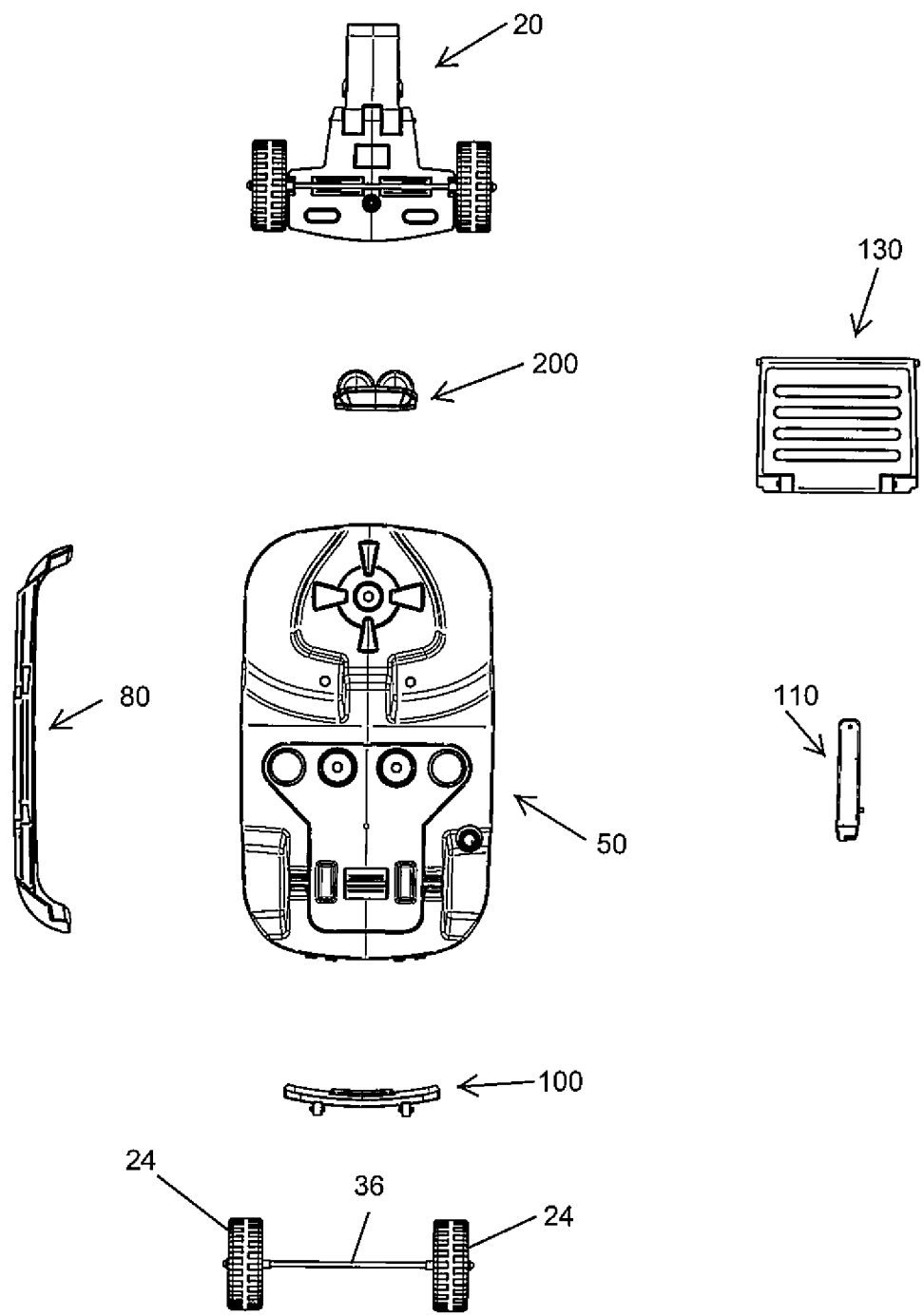
FIG. 12 shows a bottom view of the exploded view of FIG. 11.

FIGS. 11 and 12 show exploded views of the multipurpose wagon 10 with the removable panel 80, the rear door 100, the seat 130, the access door 110, the cup holder 200, the front wheel assembly 20, the rear wheels 24 attached to the axle 36 and the wagon body 50.

Figure 13:
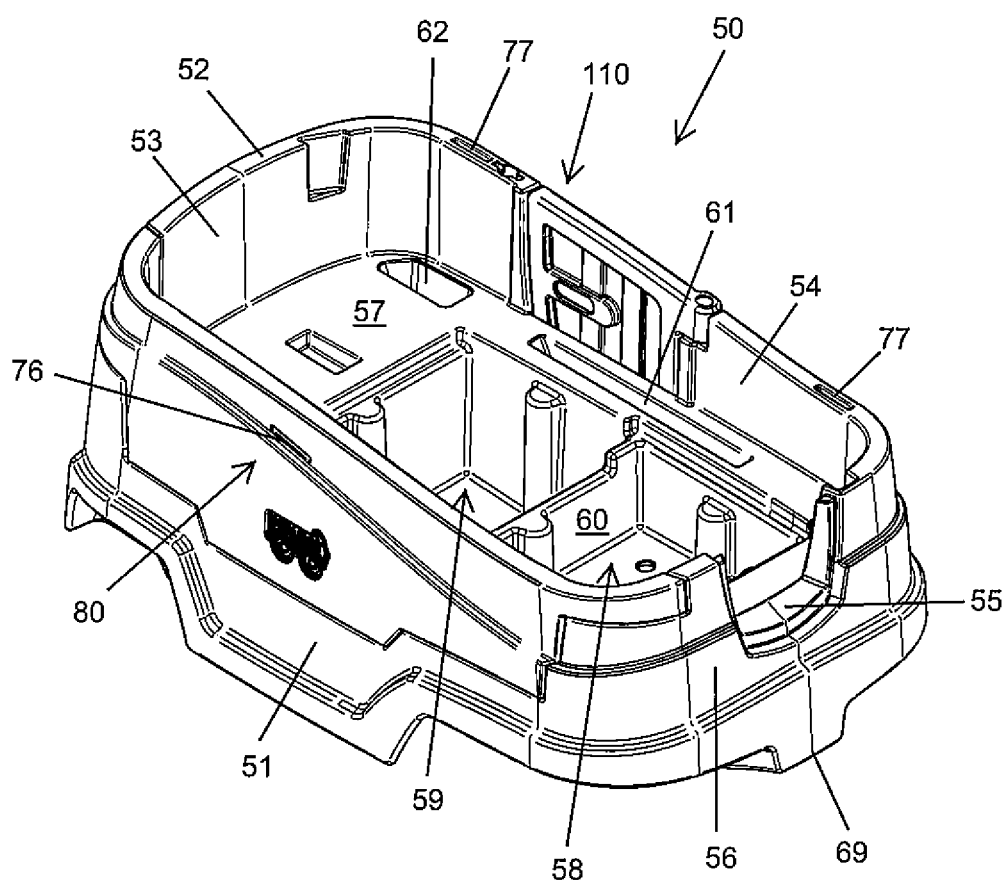
FIG. 13 illustrates a perspective view of the wagon body of FIG. 1 with the seat removed for clarity.

FIG. 13 shows the wagon body 50 with the seating surface 130, the front wheel assembly 20 and the rear wheels removed for clarity. The wagon body 50 is a molded plastic material with channels molded therein. The front wall 56 has a central aperture 55 therein for receiving the cup holder 200. Located at the bottom of the front wall 56 and equally spaced either side of the body centerline axis is the land 69 under which the front wheel assembly 20 is centrally mounted. The two storage compartments 58, 59 located beneath the planar floor 57 of the passenger compartment are separated by the partition wall 60 passing approximately through the middle of the storage compartments 58, 59. Also illustrated in FIG. 13 is the socket 76 for receiving one end of the accessory tray 160 therein. The removable panel 80 is located within the side wall 51 of the wagon body 50. On the opposing side wall 54, the access door 110 is pivotally mounted to allow access to the interior of the passenger compartment. The perimeter wall which surrounds the passenger compartment has a top surface 52 which in the side wall 54 has the sockets 77, 78 for retaining objects to the wagon 10.

Figure 14:
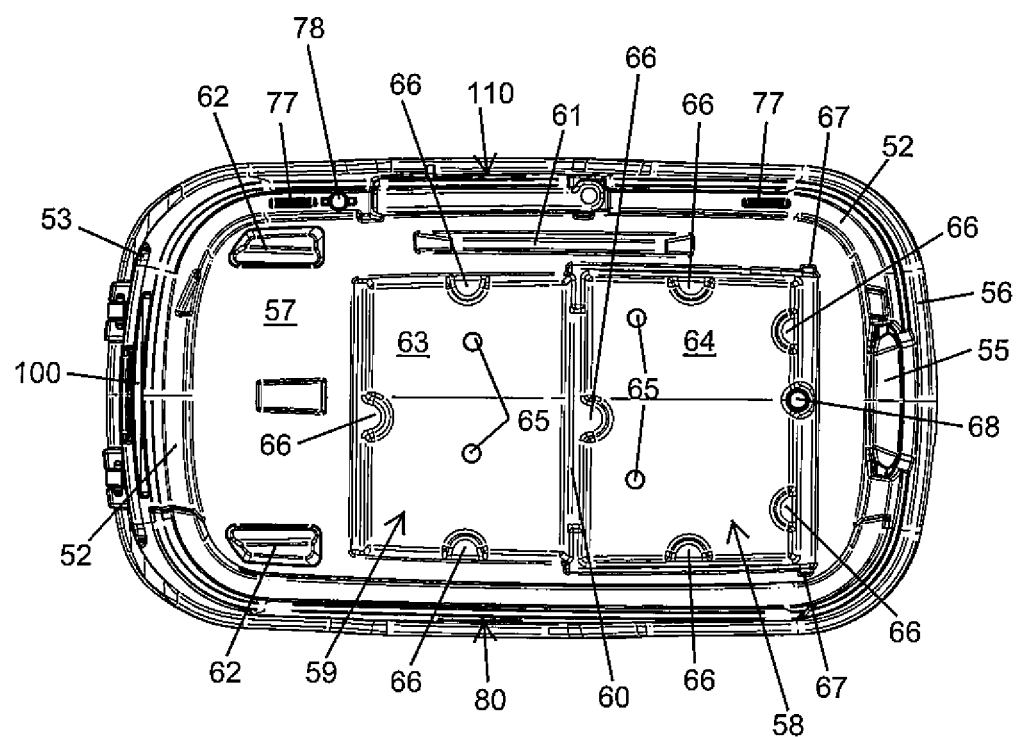
FIGS. 14 and 15 show top and bottom views of FIG. 13.
Figure 15:
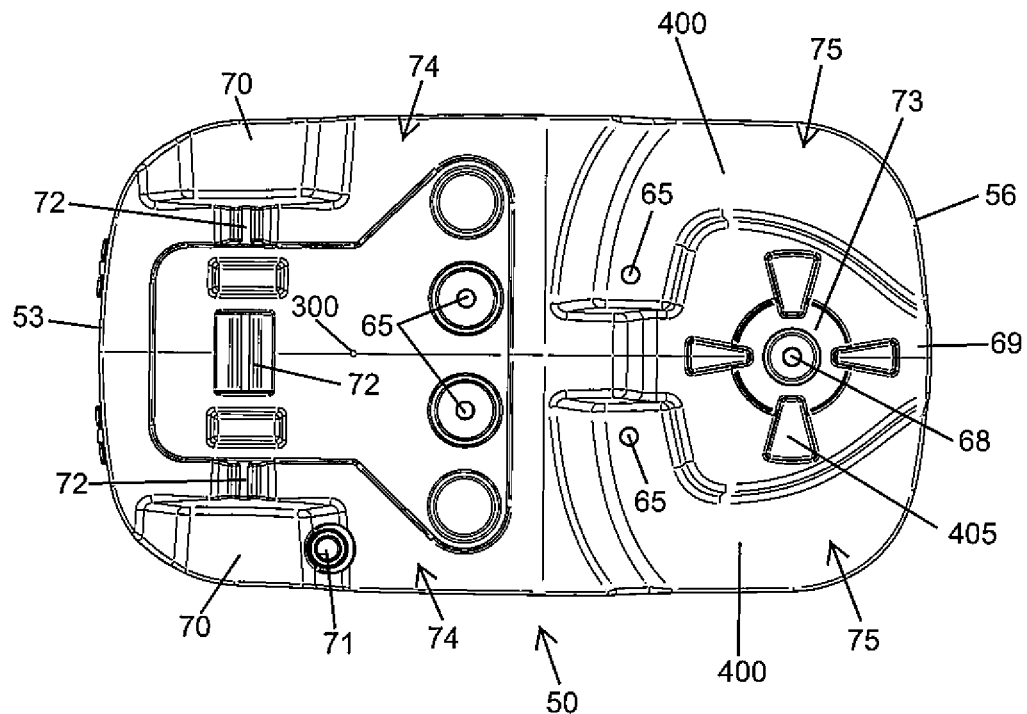
Figure 16:
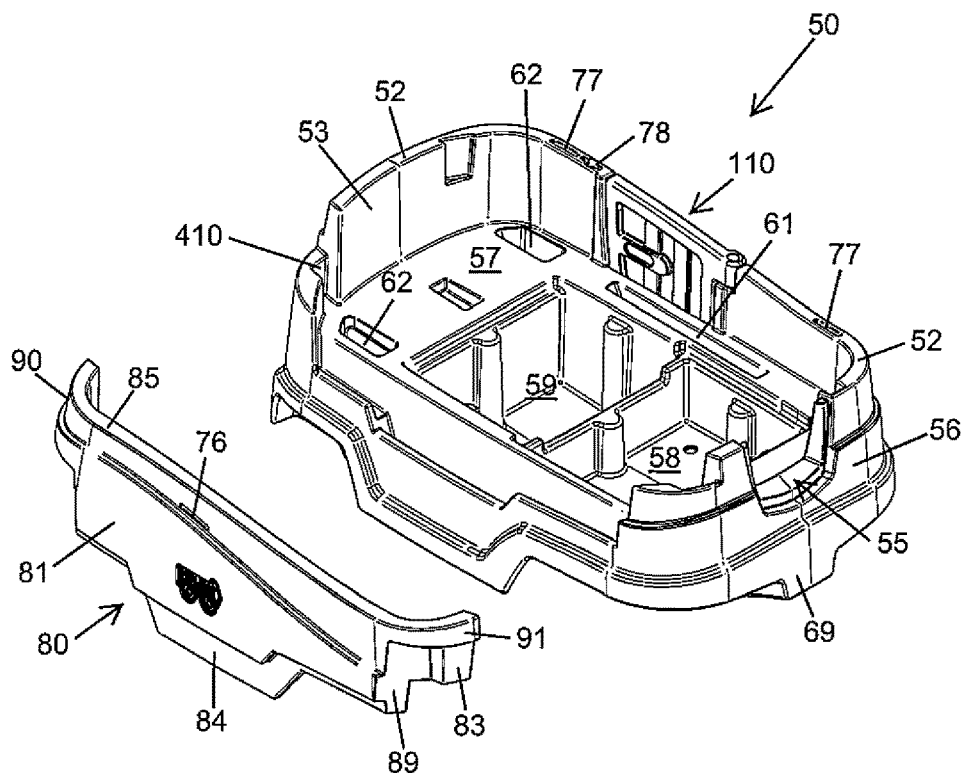
FIGS. 16 and 17 show the wagon body of FIG. 13 with the removable panel exploded from the side of the body.
Figure 17:
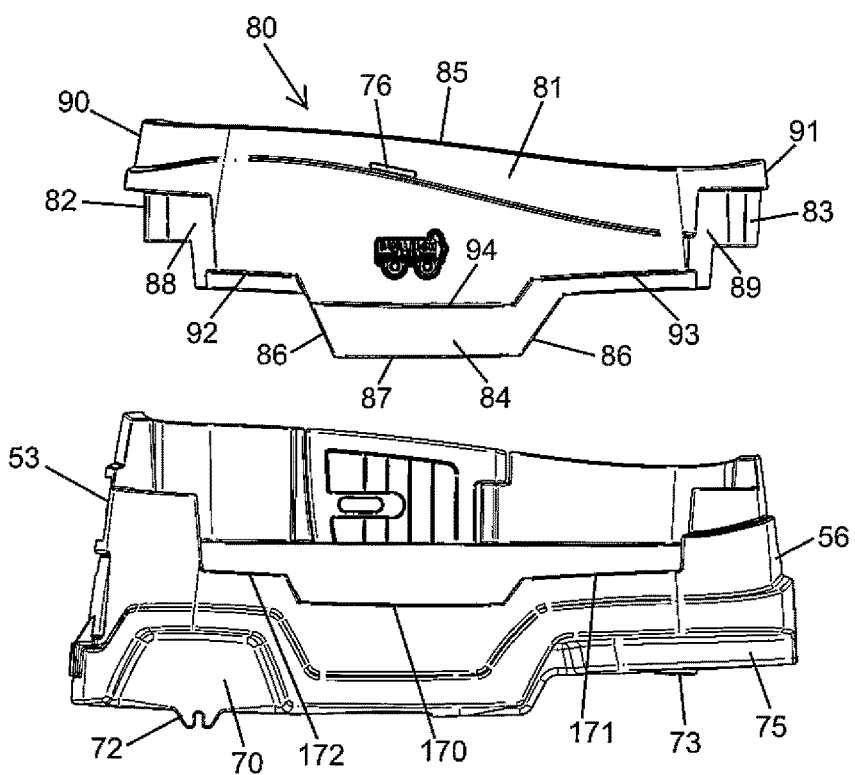

FIGS. 14 and 15 illustrate top and bottom views of the body of FIG. 13. Extending around the perimeter of the floor 57 and the storage compartments 58, 59 is a recess for receiving the seat 130. Also located around the perimeter of the first and second storage compartments and at a distance below the floor 57 are the mounting pads 66 which support the underside of the seating surface 130. Located adjacent the front wall 56 of the first storage compartment 58 are the recesses 67 for receiving the tabs 137 located on either side of the upper panel 131 of the seating surface 130. The recesses 67 allow the tabs 137 to be pivotally retained therein. The base 63, 64 of the storage compartments 58, 59 also show the apertures 65 which are used as drains for the storage compartments 58, 59.

FIG. 15 shows the bottom view of the wagon body 50 with the front and rear wheel assemblies removed for clarity. The bottom of the wagon body 50 is molded from linear low-density polyethylene plastic so as to be inexpensive to manufacture. The bottom has a front section 75 and a rear section 74. The front section 75 is used to mount the front wheel assembly 20 and the rear wheel assembly is mounted to the rear section 74. Within the front section 75 is a circular surface or pad 73 circumscribing a rotation hole 68 which engages the boss 27 and circular raised section 28 of the front wheel assembly 20. Equally spaced around the circular pad 73 are reinforcing elements 405 which strengthen the base around the rotation hole 68. Surrounding the raised circular surface 73 are curved indent sections 400 which provide clearance for the wheels 24 of the front wheel assembly 20 in use. The rear section 74 has rear wheel indentations 70 which act as wheel wells for the rear wheels 24. Mounted between the two wheel wells 70 are the rear axle 36 mounting blocks 72. The mounting blocks 72 have arms extending downwardly from the rear section 74 to form an aperture for receiving and securing the rear axle 36. Also shown in FIG. 15 is the bottom 71 closing off the umbrella recess 78.

FIGS. 16 to 19 show the removable panel 80 exploded from the body 50. The panel 80 has a leading edge 91, a trailing edge 90, a top edge 85 and a bottom 87. The leading edge 91, the trailing edge 90 and the bottom 87 are all adapted to allow the panel 80 to be removably attached to the side wall 51 of the body 50. The leading edge 91 has a connector assembly comprising a block shaped projection 83 which extends downwardly from the top edge 85 and a horizontal surface 89. The trailing edge 90 has a connector assembly comprising a block shaped connector 82 which extends downwardly from the top edge 85 and the horizontal surface 88. The bottom 87 has the tab 84 with sides 86 extending upwardly from the bottom 87 of the tab 84.

The panel 80 is installed upon the wagon body 50 in the manner illustrated in FIG. 13. To install the panel 80 into the side wall 51 of the body 50, the panel is lowered towards the wagon body 50 and is oriented so that the center tab 84 is aligned with the socket 174 and the sides 86 of the tab 84 are aligned with the sides 173 of the socket 174 respectively. Likewise, the leading edge 91 and the block shaped projection 83 are aligned with the socket 420 on a side edge of the front wall 56. The trailing edge 90 and the block shaped projection 82 are aligned with the socket 410 on a side edge of the rear wall 53. The panel 80 is then urged towards the floor 57 of the wagon body 50 so that the projections 82, 83 fully engage with the sockets 410, 420, and the tab 84 is received within the socket 174. With the panel 80 fully engaged within the side wall 51 the following surfaces are located adjacent to one another. The surface 92 abuts the surface 175, the surface 94 abuts the surface 170, the surface 93 abuts the surface 176, the surface 98 abuts the surface 172, the surface 99 abuts the surface 171 and the surface 108 abuts the surface 177. Likewise, the bottom side 96 of the leading edge 91 is located adjacent and abutting the floor 57 near the front wall 56 of the body 50. The bottom side 97 of the trailing edge 90 is located adjacent and abutting the floor 57 near the rear wall 53 of the body 50.

The respective projections and sockets form an interference fit to secure the panel 80 within the side wall 51. Alternatively, the respective projections are dimensioned so that a snug fit with their respective sockets is achieved when the panel 80 is assembled to the wagon 10. While the panel 80 will remain in place due to gravity, a snug fit between the projections and sockets and the center tab and the socket will lend stability to the assembled wall 51.

Figure 18:
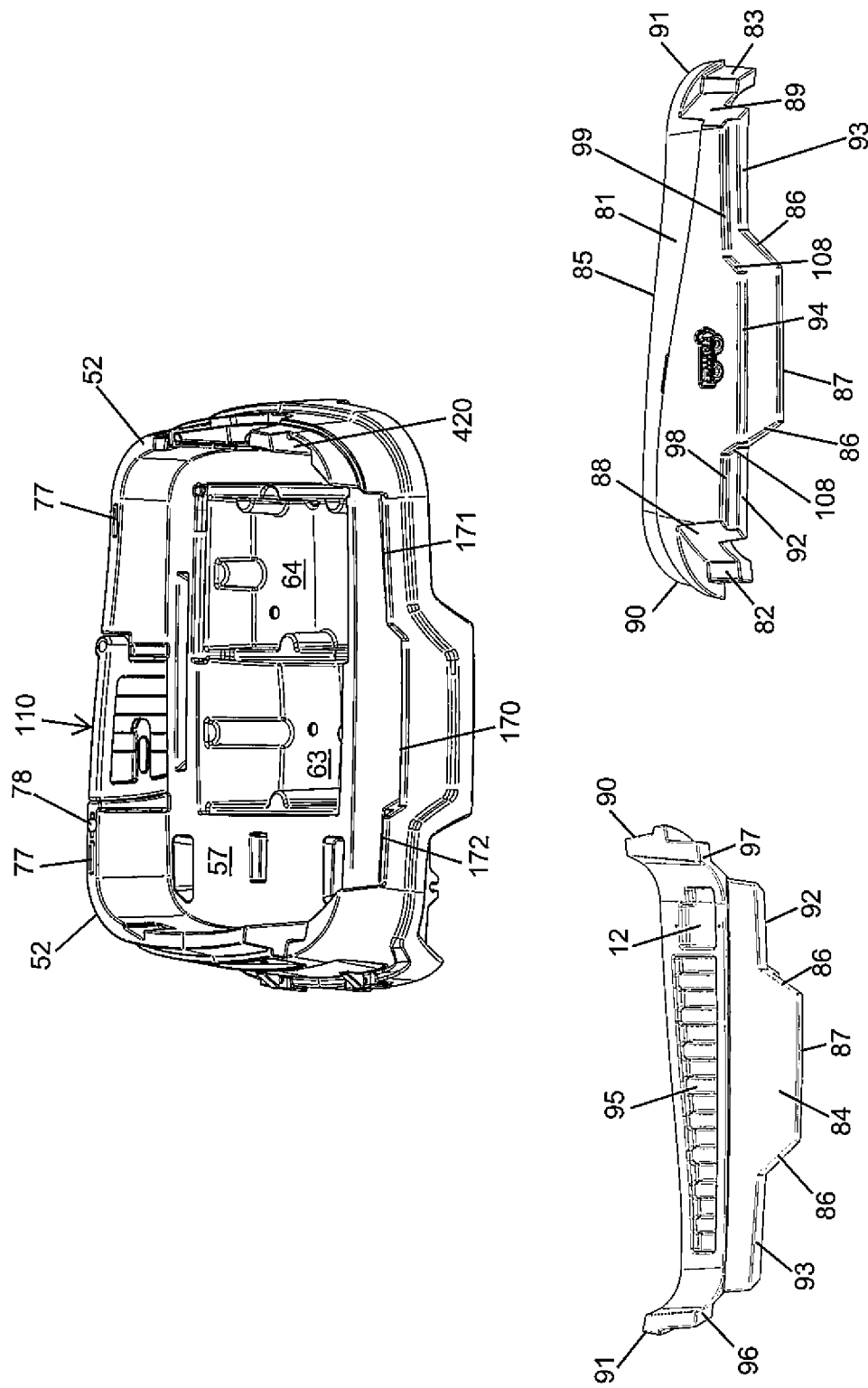
FIG. 18 shows the body of FIG. 13 showing both sides of the removable panel exploded from the body.

FIG. 18 also shows the inside wall 95 of the panel 80 which has the grooves aligned vertically along the inside wall 95 to reinforce and strengthen the molded plastic panel 80. Also, at the trailing edge end 90 of the panel 80 a recess and mounting block 12 is provided for receiving the wireless speaker 11. The wireless speaker 11 can be retained to the mounting block 12 by any well-known type of fastener. For example, hook and loop fasteners such as Velcro type straps, cable ties or an elastic cord such as a shock cord can be used to retain the speaker 11 to the mounting block 12.

Figure 19:
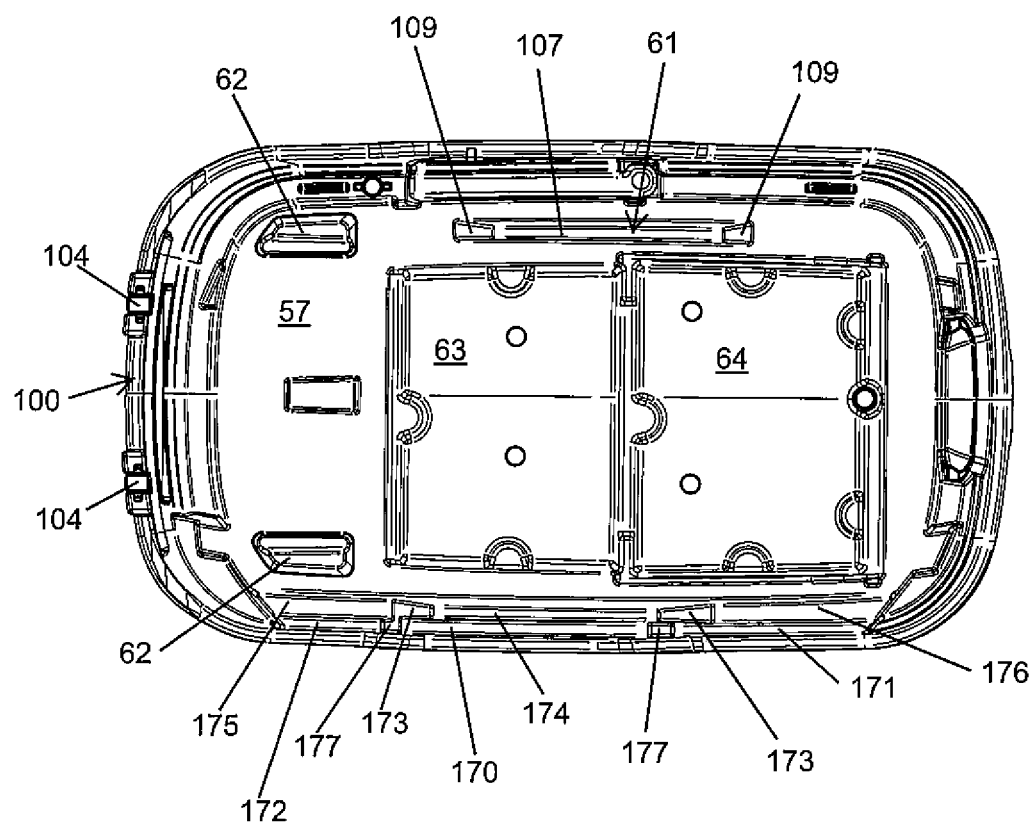
FIG. 19 shows a top view of FIG. 13.
Figure 19:
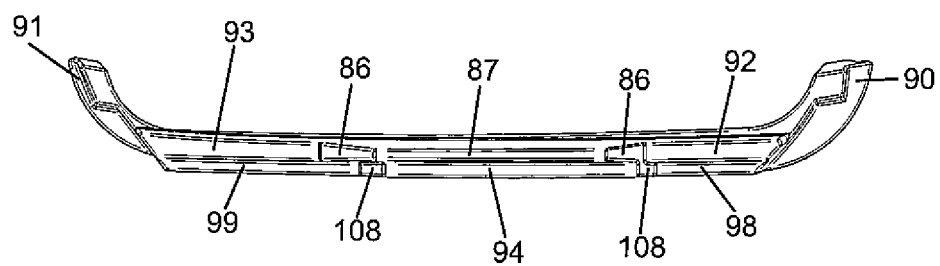

FIG. 19 illustrates the socket 61 which is utilized to receive the tab 84 when the panel 80 is removed from the side wall 51 and the wagon 10 is used as a bench-seat. The socket 61 has a flat bottom 107 which in use is aligned or abuts with the bottom 87 of the tab 84. The socket also has two side surfaces 109 which in use abut against the side walls 86 of the tab 84.

Figure 20:
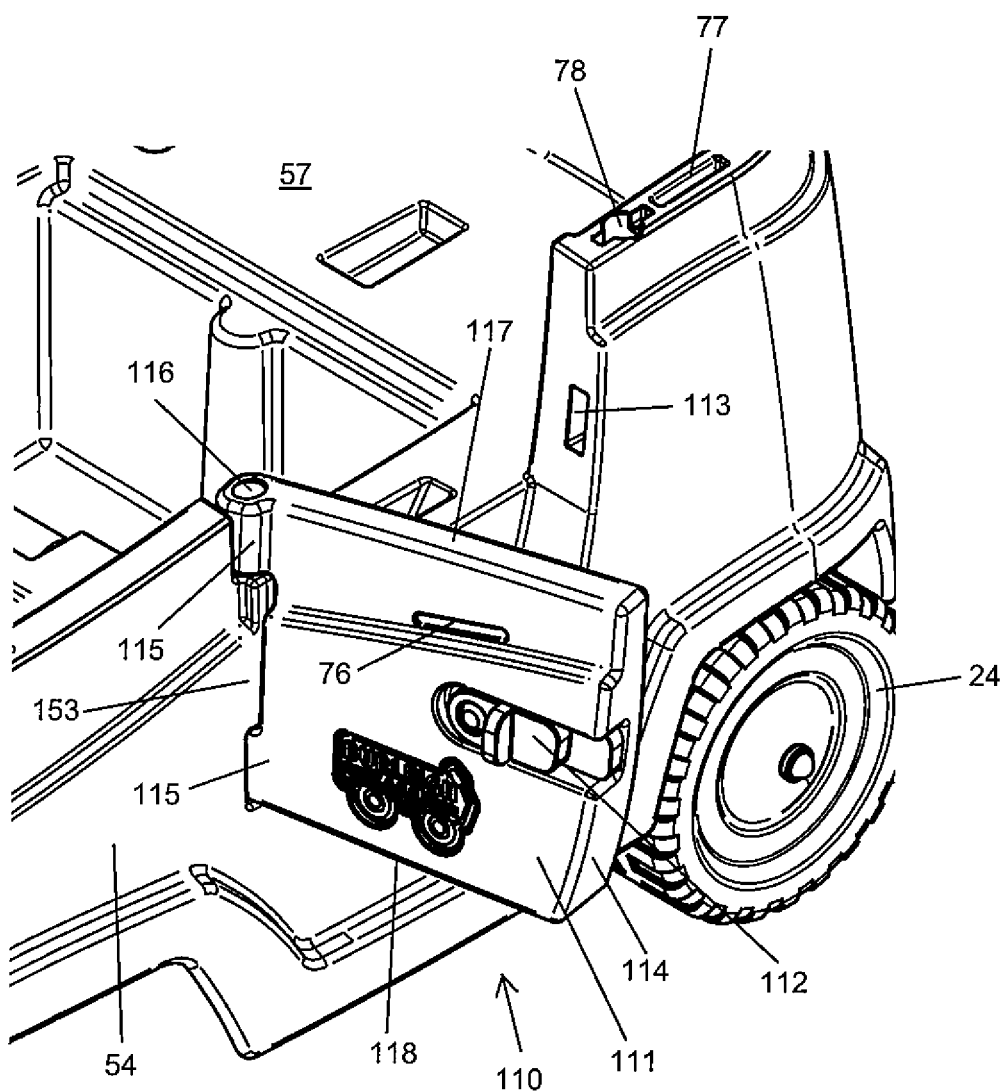
FIG. 20 shows an enlarged view of the access door in an open position.
Figure 21:
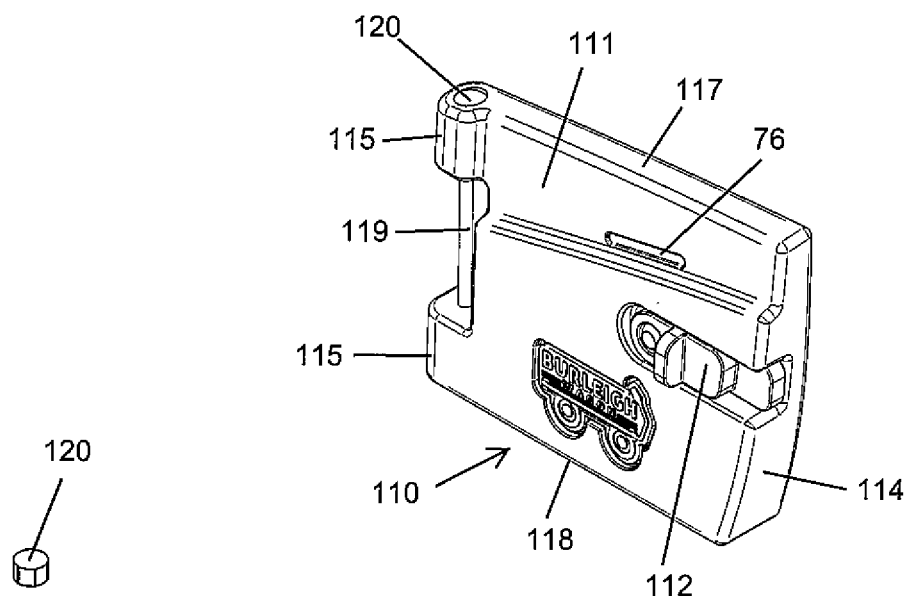
FIG. 21 shows a perspective view of the door of FIG. 20.
Figure 22:
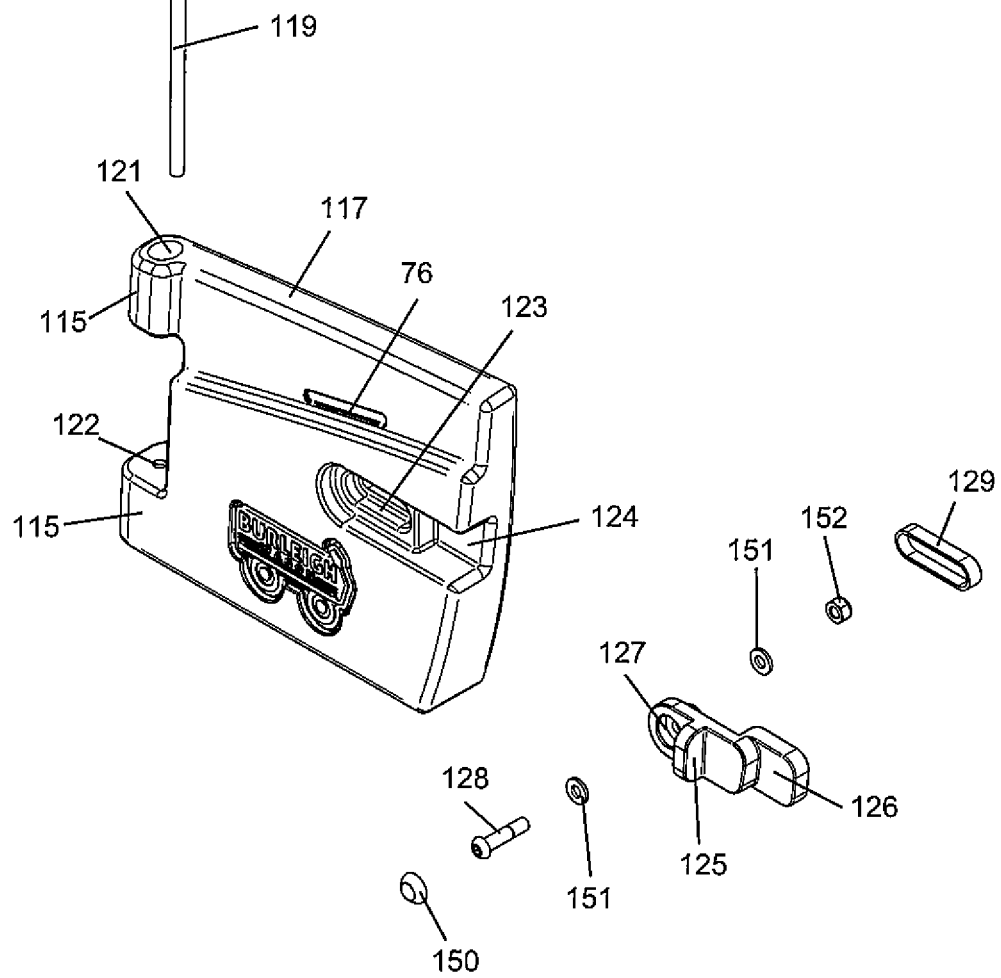
FIG. 22 shows an exploded view of the door of FIG. 21.

FIG. 20 shows an enlarged view of the access door 110 as shown in an open position. FIGS. 21 and 22 show views of the door assembly 110. The door assembly 110 is pivotally hinged to the side wall 54 and in the closed position fills the opening in the side wall 54. The door 110 is molded plastic rectangular shaped panel with a top side 117, a bottom side 118, an external side wall 114 and the hinged lugs 115 are located on the opposing side wall. The hinged lugs 115 are received on either side of the boss 153 extending from the side wall 54. The hinged lugs 115 have apertures 121,122 for receiving the pivot shaft 119 therein. The shaft 119 extends through the apertures 121, 122 and the boss 153 to allow the door 110 to move between open and closed positions. A cap 120 is placed over the end of the shaft 119 and is retained within the aperture 121. The door 110 also has a latch assembly 112 located within the elongate aperture 123 and the block shaped socket 124 for securing the door 110 in the closed position. The latch 112 has a first end tab 126 which in use engages the slot 113 in the side wall 54 to hold the door 110 closed. The first end tab 126 is slideably located within the block shaped socket 124. The latch 112 has at the opposing end from the tab 126 an a further tab with an aperture 127 and a raised section which is slideably received with the elongate aperture 123 and the aperture 127 receives the mounting bolt 128 and fastening components 151, 152. With the bolt 128 passing through to the backside of the door and the fasteners 151, 152 attached to slideably secure the latch 112 to the door 110. Extending perpendicular to the tab 126 and aperture 127 is an activating arm 125 which allows a user to slide the latch assembly 112 between the open and closed positions.

The latch 112 is mounted within an elongated aperture 123 within the door 110. A cover 129 is located over the backside to hide the fasteners 151, 152. A cap 150 is placed over the end of the bolt 128 to provide a finished look. The door 110 also has the socket 76 which is used to receive an end of the accessory tray 160.

Figure 23:
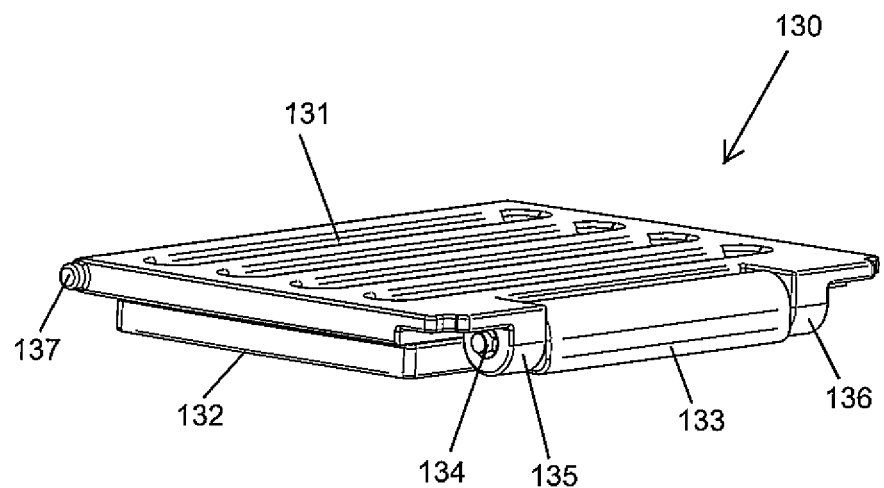
FIGS. 23 to 25 show a perspective, end and side views of the seat of FIG. 1.
Figure 24:
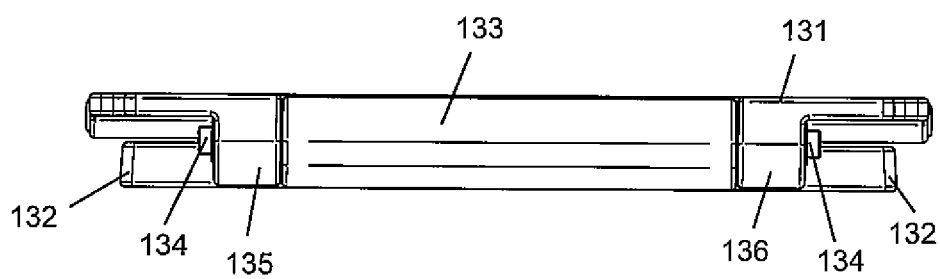
Figure 25:
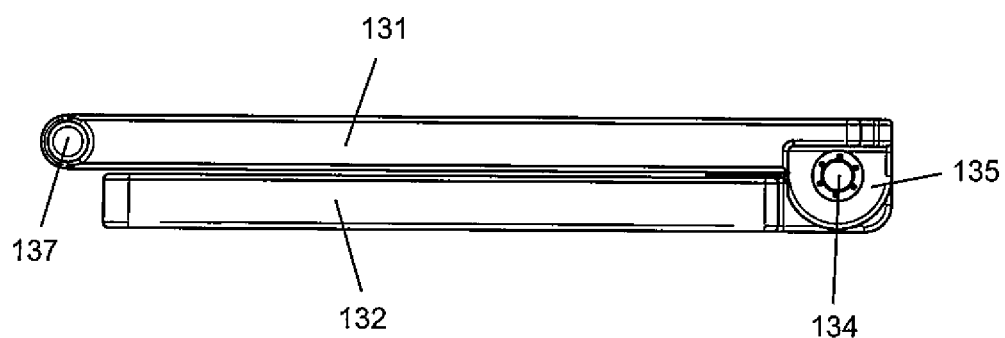

FIGS. 23 to 25 show the seating surface 130 with the upper panel 131 and the lower panel 132 juxtaposed with each other. The upper panel 131 is hinged to lower panel 132 by the pivot shaft 134 located at one end of the seating surface 130. The upper panel 131 has at one end the cylindrical tabs 137 which in use are designed to allow the seating surface 130 to be pivoted within the floor 57 of the body 50. The upper panel 131 has a pair of spaced apart knuckles 135, 136 located at the opposing end of the upper panel 131 with the aperture 140 extending through each knuckle 135, 136. The opening between the knuckles 135, 136 receive the cylindrical body 133 therein. The cylindrical body 133 has an aperture 141 passing therethrough. When assembled, the shaft 142 passes through the knuckles 135, 136 and the cylindrical body 133 to pivotally secure the upper panel 131 to the lower panel 132. Fasteners 143 are secured to either end of the shaft 142 to retain the shaft 142 within the apertures 140, 141. By way of example only the fastener 143 may be a star lock washer with a cap or no cap which do not require a thread or groove in the ends of the shaft 142 to retain the fastener 143 in place. Alternatively, the ends of the shaft 142 may be threaded to receive a threaded fastener 143. Within each panel 131, 132 an opening 139 receives the gland 138 which allows the drainage of water from within the molded plastic panels 131, 132.

Figure 26:
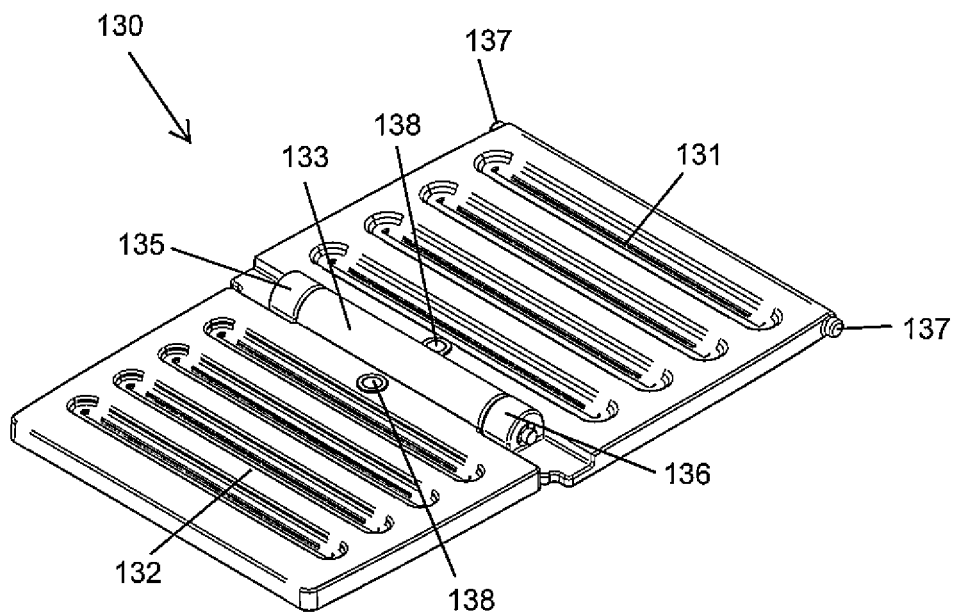
FIG. 26 shows the seat of FIG. 23 in an expanded orientation showing the upper and lower panels aligned in the same plane.
Figure 27:
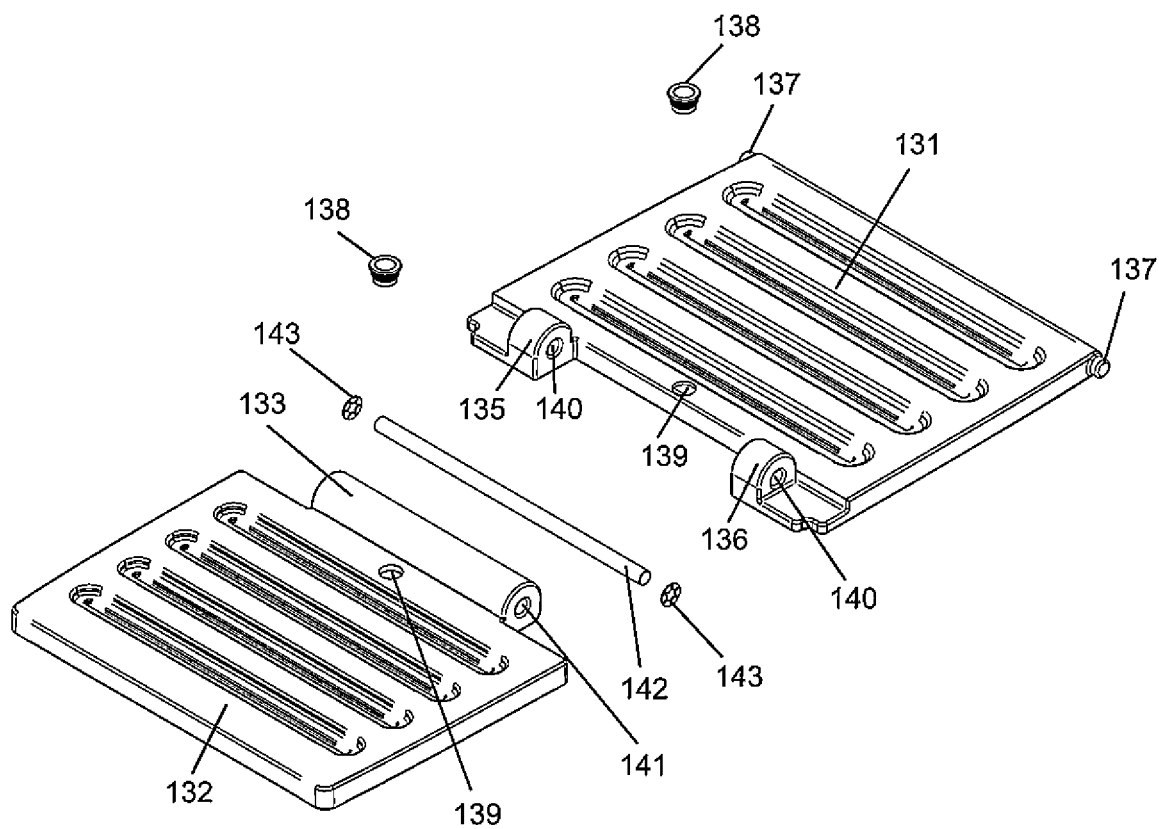
FIG. 27 shows an exploded view of FIG. 26.

FIGS. 26 and 27 shows the seating surface 130 extended to be configured in the bench configuration. In the bench configuration the seating surface 130 covers both storage compartments 58, 59 to form the floor of the wagon. The panels 131, 132 are extended to form a planar flat surface with the planar floor 57 of the passenger compartment.

Figure 28:
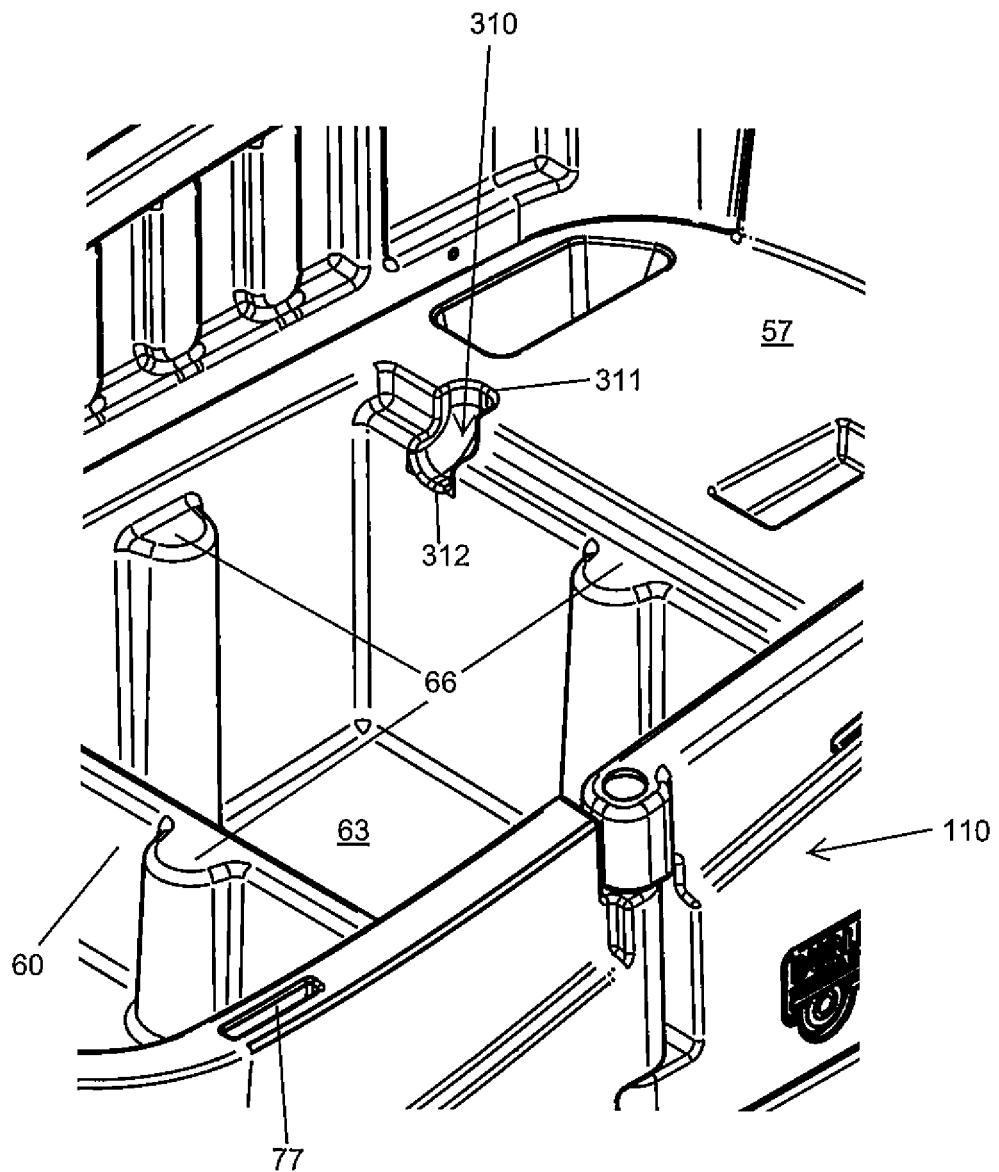
FIG. 28 shows an enlarged view of the floor of the passenger compartment.
Figure 29:
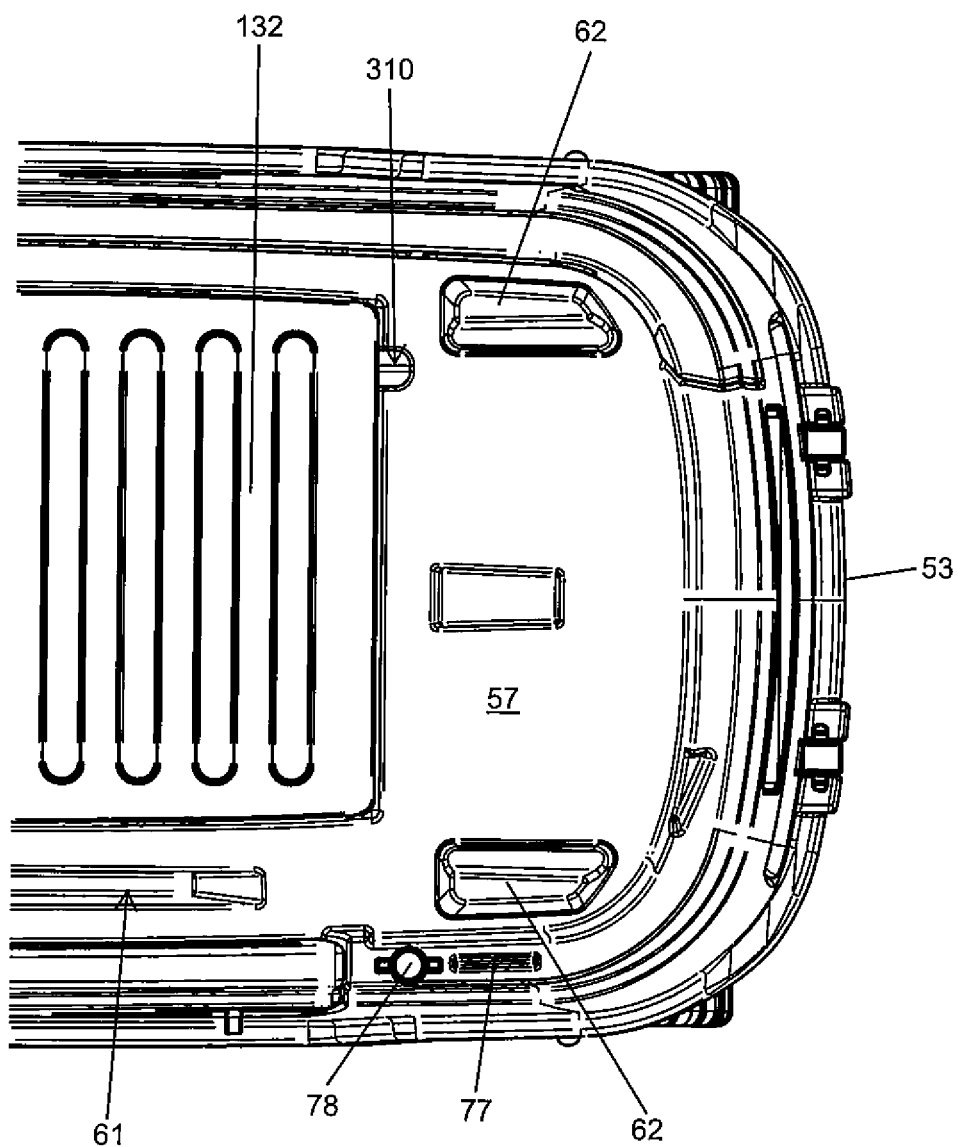
FIG. 29 shows an enlarged view of the floor of the passenger compartment with the seat covering the storage compartment.

FIGS. 28 and 29 show enlarged views of the passenger compartment. FIG. 28 shows the seating surface removed and in FIG. 29 shows the seating surface configured as a bench seat. To allow the seating surface 130 to be easily removed when in the bench seat configuration a groove 310 is provided in the wall of the second storage compartment 59. A first end 311 of the groove 310 is located adjacent the floor 57 and a second end 312 is located within the storage compartment 59 rear wall. The groove 310 allows a user to insert their finger under the end of the lower panel 132 of the seating surface 130 to easily lift the seating surface 130 from within the floor 57 of the wagon body 50.

FIGS. 30 to 32 show an enlarged view of the aperture 55 for receiving the cup holder 200. The aperture 55 is located within the front wall 53 of the body 50. Surrounding the aperture 55 are the block shaped projections 250, 253, 254 which are received within the recess 204, 206 located around the cup holder 200. The block shaped projections 250, 253, 254 are sized to receive the recesses 204, 206 in an interference fit fashion. As a result, the cup holder 200 is secured to the front wall 53 as shown in FIGS. 9 and 10. The cup holder 200 has two circular molded recesses 201 for receiving a cup therein. The cup holder 200 has a top surface 202, a front wall 203 and a back wall 205. Located between the front wall 203 and the back wall 205 are the recesses 204, 206. When the cup holder 200 is inserted into the aperture 55 in the front wall 53, the front wall 203 is seated against the walls 251 and 252 of the aperture 55. Likewise, the horizontal surface 207 formed between the front wall 203 and the rear wall 205 of the cup holder 200 abut against the corresponding horizontal surface 255, 256 located on either side of the aperture 55.

Figure 33:
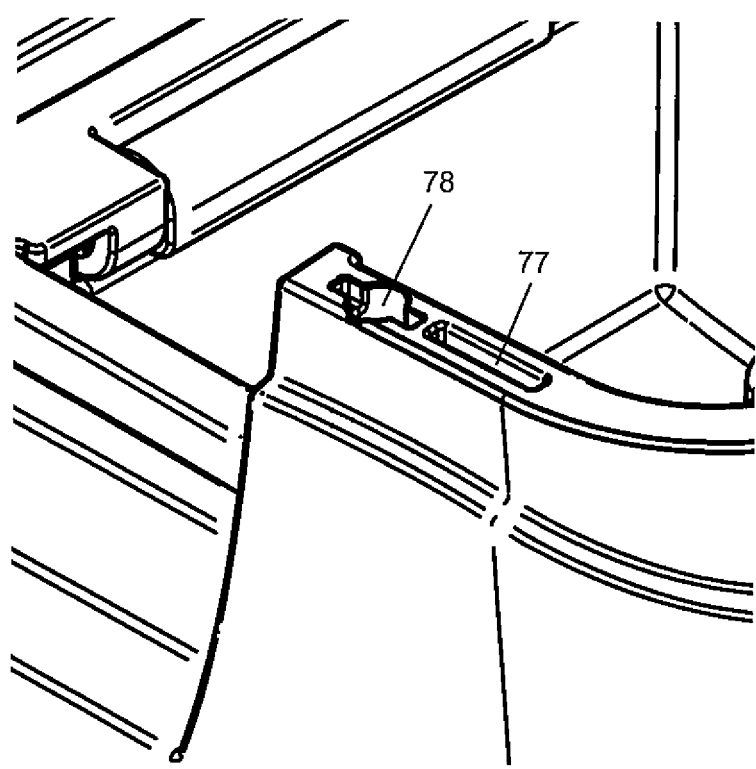
FIG. 33 shows an enlarged view of attachment means located in a top surface of the wagon body.
Figure 34:
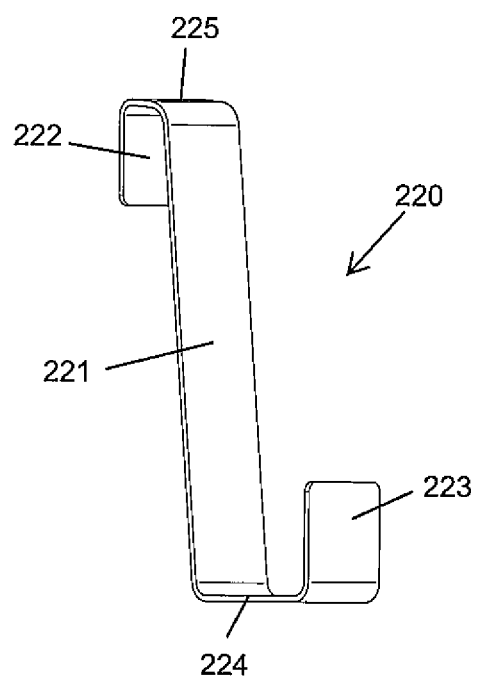
FIG. 34 shows a surfboard holder which can be inserted into one of the attachment means in FIG. 33.

FIG. 33 shows an enlarged view of the sockets 77, 78 which are used to retain objects to the side of the wagon 10. For example, the socket 77 can be used to retain the bracket 220 as shown in FIG. 34. The bracket 220 is an 'S' shaped bracket with a longitudinally extending first section 221 with two perpendicular sections 224, 225 extending from either end of the first section 221. At each end of the perpendicular sections 224, 225 are further vertical sections 222, 223. The brackets 220 can be utilized to store or hold a surfboard or surf craft (not shown) or alternatively can be used to store the umbrella 260 or a portable picnic table when not being used.

Figure 35:
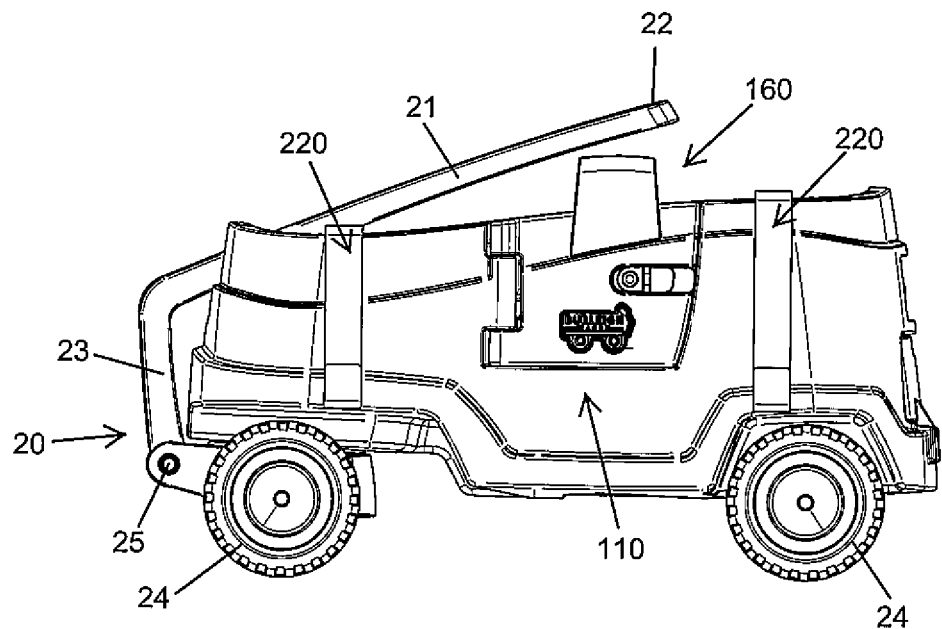
FIGS. 35 and 36 show a side and top view of the multipurpose wagon of FIG. 1 with the cup holder removed and the handle pivoted over the body.
Figure 36:
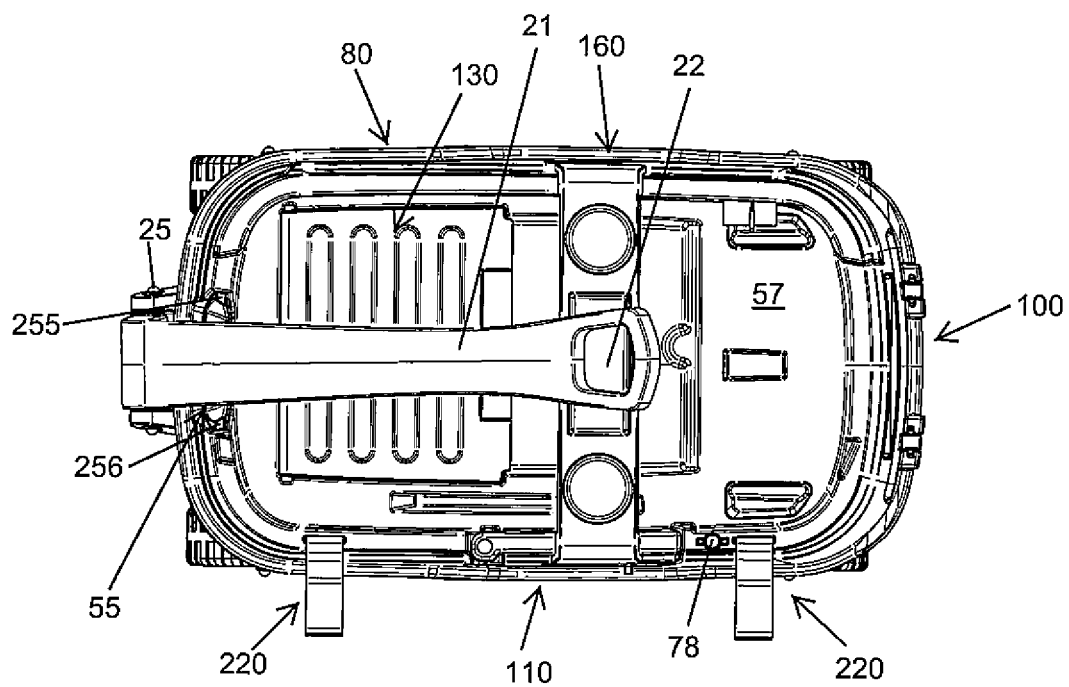

FIGS. 35 and 36 show an embodiment of the present invention in which the cup holder 200 has been removed from the front wall 53 of the wagon body 50 to allow the handle assembly 21, 22, 23 to be pivoted such that the handle portion 21 extends above the wagon floor 57. In this position the handle assembly 21, 22, 23 is stored safely above the passenger compartment of the wagon 10. A portion of the handle arm 21 is positioned within the aperture 55 when the cup holder 200 is removed. This ensures that the handle can be rotated to a position above the wagon 10 and does not lie on the floor and create a trip hazard. This is particularly useful when the wagon 10 is parked in a high traffic area such as a cafe or coffee shop. The position of the arm 21 within the aperture 55 also provides a front wheel lock to prevent rotation of the front wheel assembly 20. The handle assembly is designed such that when it is rotated to lie above the floor 57 in the substantially horizontal position, the handle assembly does not increase significantly the overall height of the wagon 10. This minimization of height is efficient from a storage and shipping point of view. In particular, when the wagon 10 is placed in the rear of a vehicle for transport with the handle assembly 21, 22, 23 pivoted as shown in FIGS. and 36 the amount of disassembly of the wagon 10 required to fit in the rear of the vehicle is significantly reduced.

Figure 37:
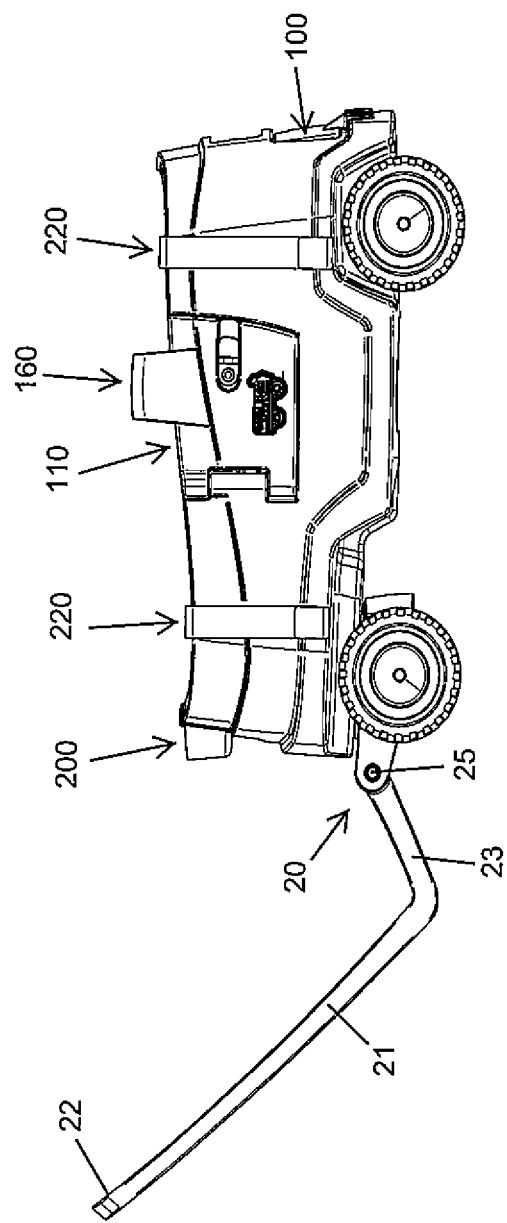
FIGS. 37 and 38 show a side and top view of the multipurpose wagon of FIG. 1 with the handle extending from the front of the wagon body.
Figure 38:
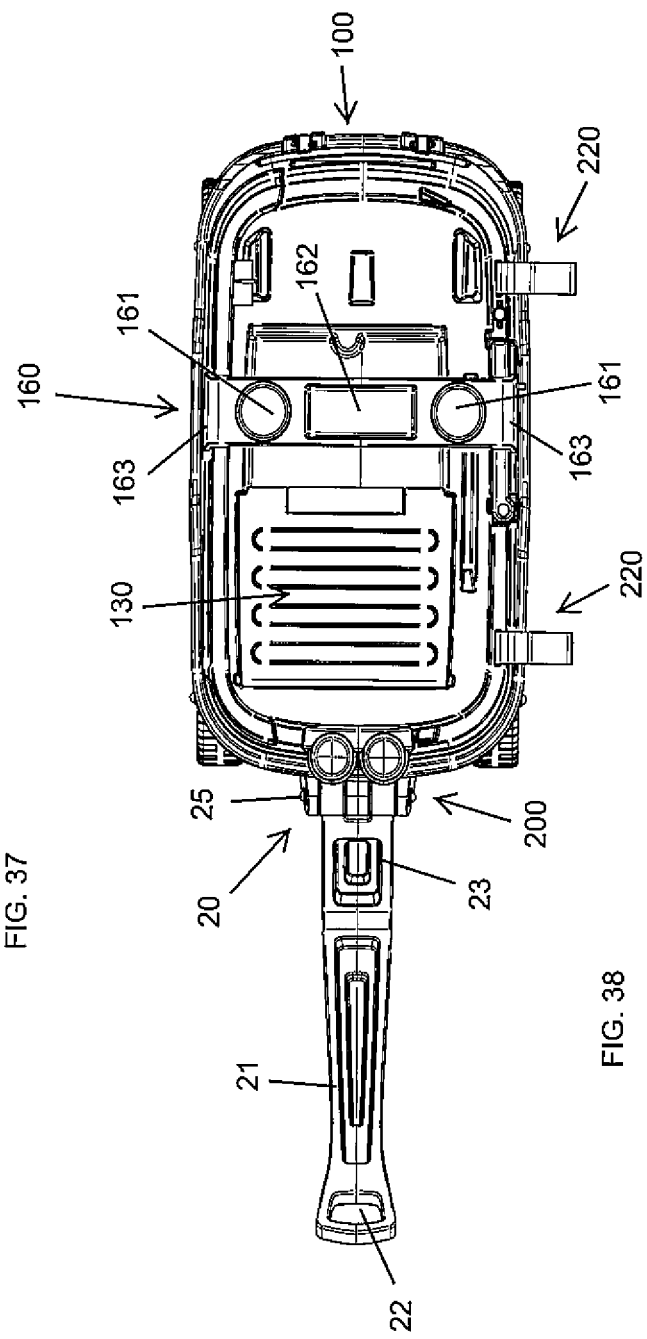

FIGS. 37 and 38 shows the wagon 10 with the cup holder 200 installed in the front wall 53 and the handle assembly 21, 22, 23 pivoted to the front of the front wheel assembly 20. In this position the handle is extended away from the body 50 and forward of the front wall 53 to allow a user to pull or push the wagon 10 over a supporting surface.

Figure 39:
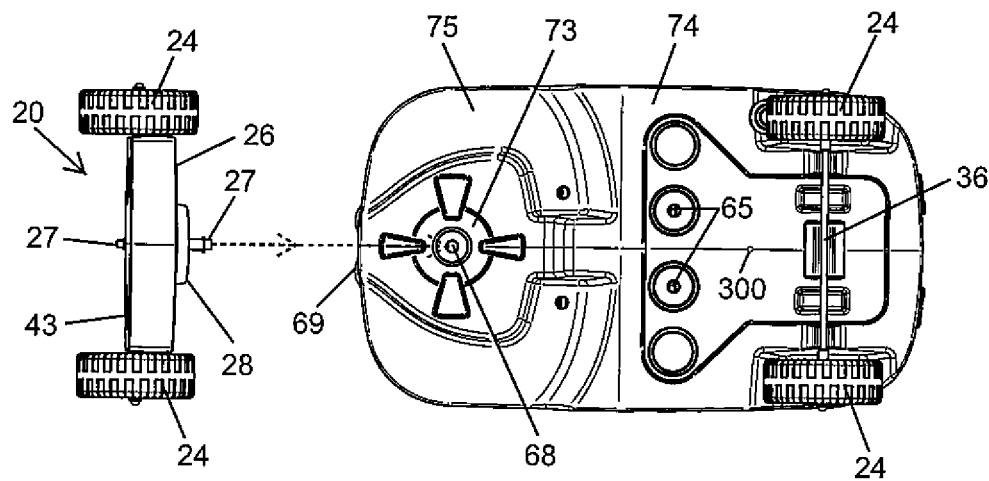
FIG. 39 shows the steering assembly exploded from the wagon body.
Figure 40:
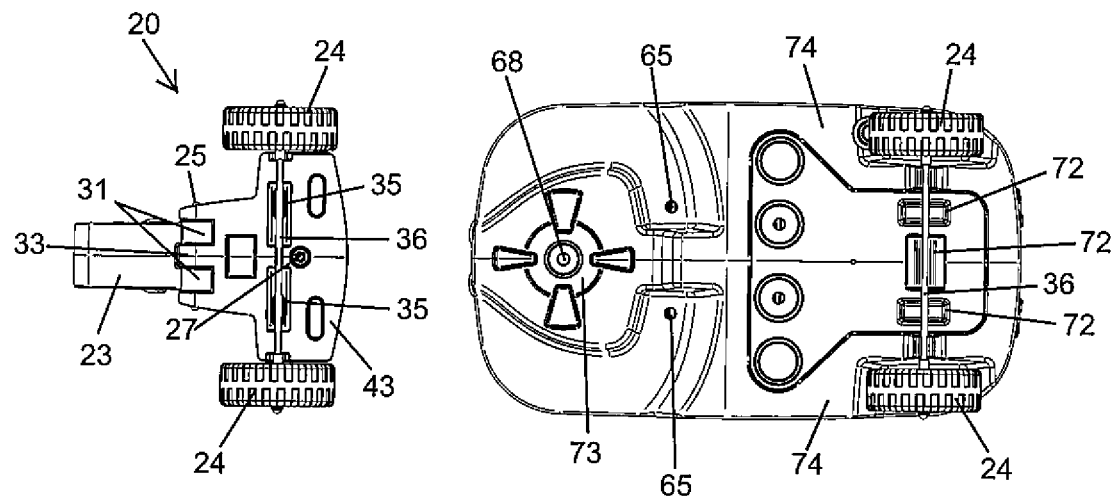
FIG. 40 shows an opposite side view of the steering assembly as shown in FIG. 39.

FIGS. 39 and 40 illustrate the connection of the front wheel assembly 20 to the bottom of the wagon body 50. In FIG. 39, the arrow shows the direction in which the front wheel assembly 20 will be connected to the wagon body 50. The boss 27 extending from the front wheel assembly 20 is inserted through the aperture 68 located in the bottom of the body 50 to pivotally connect the front wheel assembly 20 to the wagon body 50. When the boss 27 is located within the aperture 68 the raised circular section 28 on the front wheel assembly 20 abuts against the circular section 73 on the bottom of the wagon body 50. The two circular sections 28, 73 act as bearing surfaces to allow the rotation of the front wheel assembly 20 in an arc with respect to the body 50 of the wagon 10. An end of the boss 27 is secured within the first storage compartment 58 by a fastening device (not shown).

Figure 41:
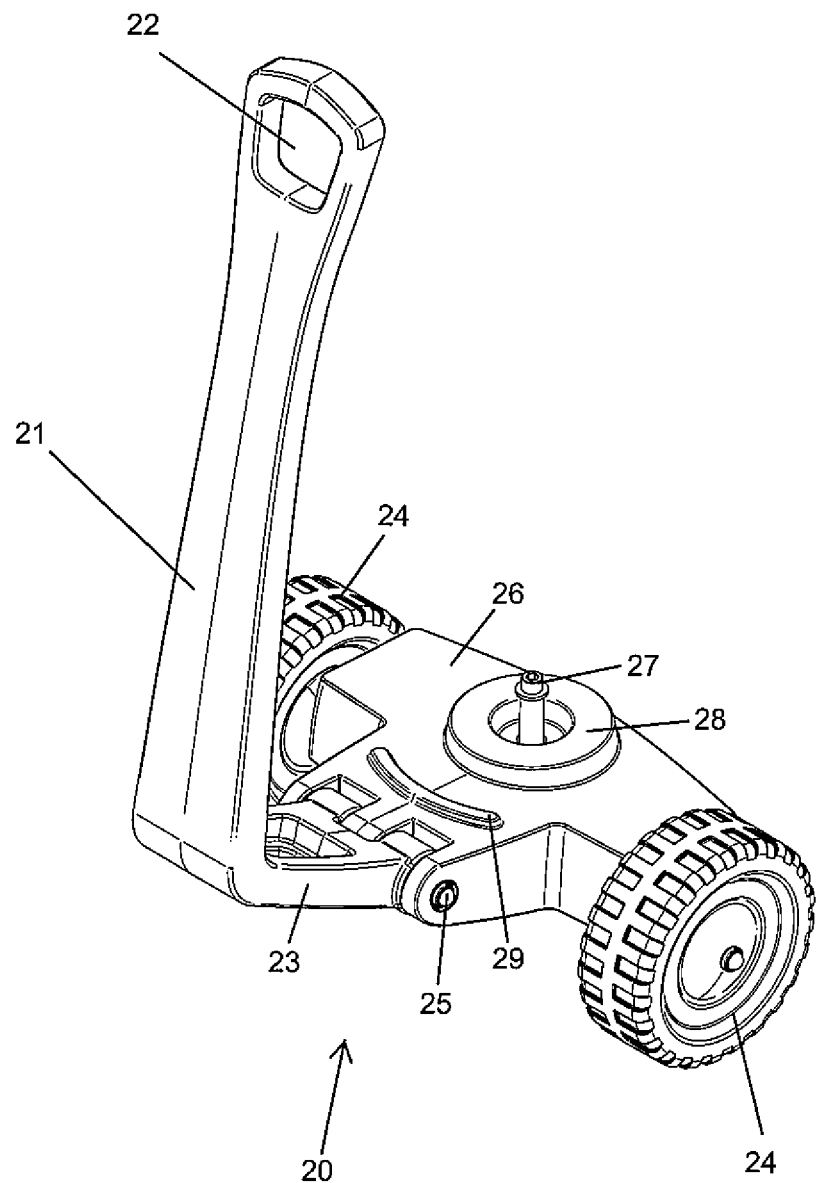
FIG. 41 shows a perspective view of the front steering assembly.

FIG. 41 shows the front wheel assembly 20 with the remaining components of the wagon 10 removed. The front wheel assembly 20 consists of the housing 26 with the centrally located boss 27 extending from the top of the housing 26. The boss 27 is circumscribed by the raised circular section 28. Towards the front of the housing 26 is a raised semi-circular section 29 which when the front wheel assembly 20 is pivotally retained to the aperture 68 in the wagon body 50 the section 29 abuts against the front 69 of the body and helps to support the front wheel assembly 20 to the body 50. Extending from either end of the housing 26 are the wheels 24 which are attached to the front axle 36 by fasteners 34. Attached to the front of the housing 26 is the pivot pin 25 for pivotally attaching the end 23 of the handle assembly. The handle assembly is an outwardly extending lever arm having a first section 23 pivotally attached to the housing 26 and an approximately vertical section 21 which has a distal end which includes an opening 22. The distal end is configured for grasping by a person for pulling or pushing the wagon 10. In a preferred embodiment, the handle assembly 21, 22, 23 has an arcuate profile which outwardly and forwardly extends from the front wall of the housing 26 of the front wheel assembly 20. Other handle assembly configurations can also be used. The handle assembly 21, 22, 23 is made of a durable lightweight, strong material. The handle assembly 20 is preferably made of a molded thermoplastic material. Alternatively, other materials can be used such as, for example, other plastics, wood or metal. Alternatively, the opening 22 may contain indentations for receiving the fingers of the hand of a user pulling or pushing the wagon 10. Further alternatively, the opening 22 may have soft foam wrapped around the walls of the opening to provide a comfortable connection for the user.

Figure 42:
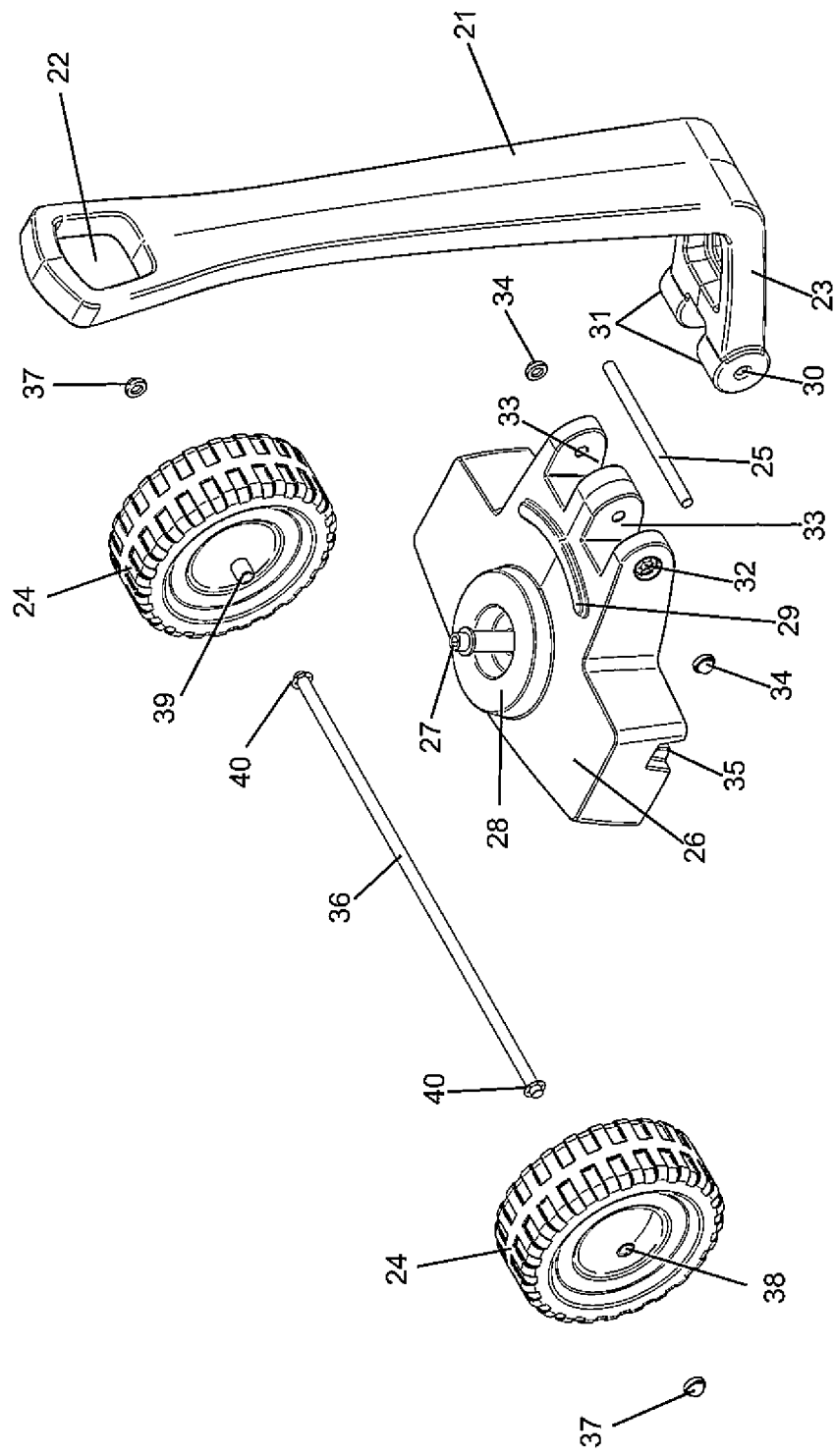
FIGS. 42 and 43 show an exploded perspective and top view of the front steering assembly of FIG. 41.
Figure 43:
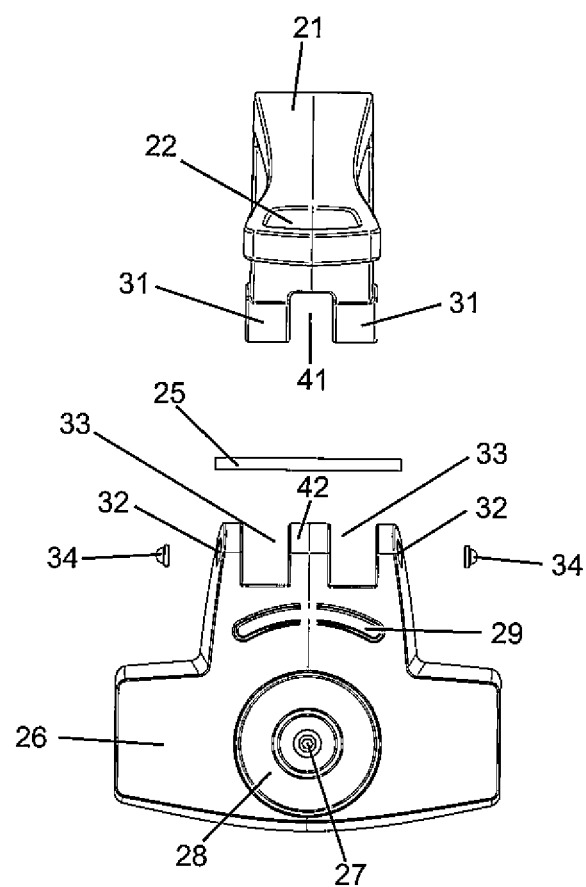
Figure 43:
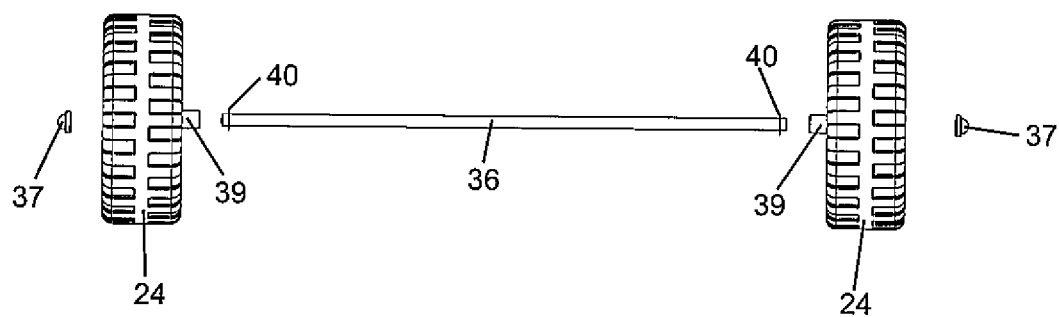

FIGS. 42 and 43 show exploded views of the front wheel assembly 20. The handle assembly is pivotally secured to the front of the housing 26 by the pivot pin 25. The pin 25 extends through the knuckles 31 and aperture 30 in the lever arm end 23 of the handle assembly. The knuckles 31 are located within the sockets 33 in the front of the housing 26. The pin 25 extends through the apertures 32, located in both sides of the socket 33 and secured in place by a retainer 34 located on either end of the pin 25. The retainer may be a star washer with a cap or a threaded fastener 34 may be threaded to an end of the pin 25. This allows the handle assembly 21, 22, 23 to be pivoted around the pin 25. The front axle 36 is secured to the housing 26 by mounting blocks 35 located in the bottom side of the housing 26. Located either end of the axle 36 are the wheels 24 which are mounted for rotation on the housing 26. The wheels 24 have a projection 39 which spaces the wheel 24 a distance away from either end of the housing 26 such that each wheel 24 is free to rotate. Each wheel 24 is secured to the axle 36 by fasteners 37 located on the outside of each wheel 24 and internally on the axle 36 the projection 39 is abutted against the star washer 40. The ends of the axle 36 extend through apertures 38 in each wheel 24 and the fastener 37 secures the wheels 24 to the axle 36. The wheels 24 may be a plastic molded wheel or alternatively a rubber inflatable wheel or solid rubber or foam wheel.

Figure 44:
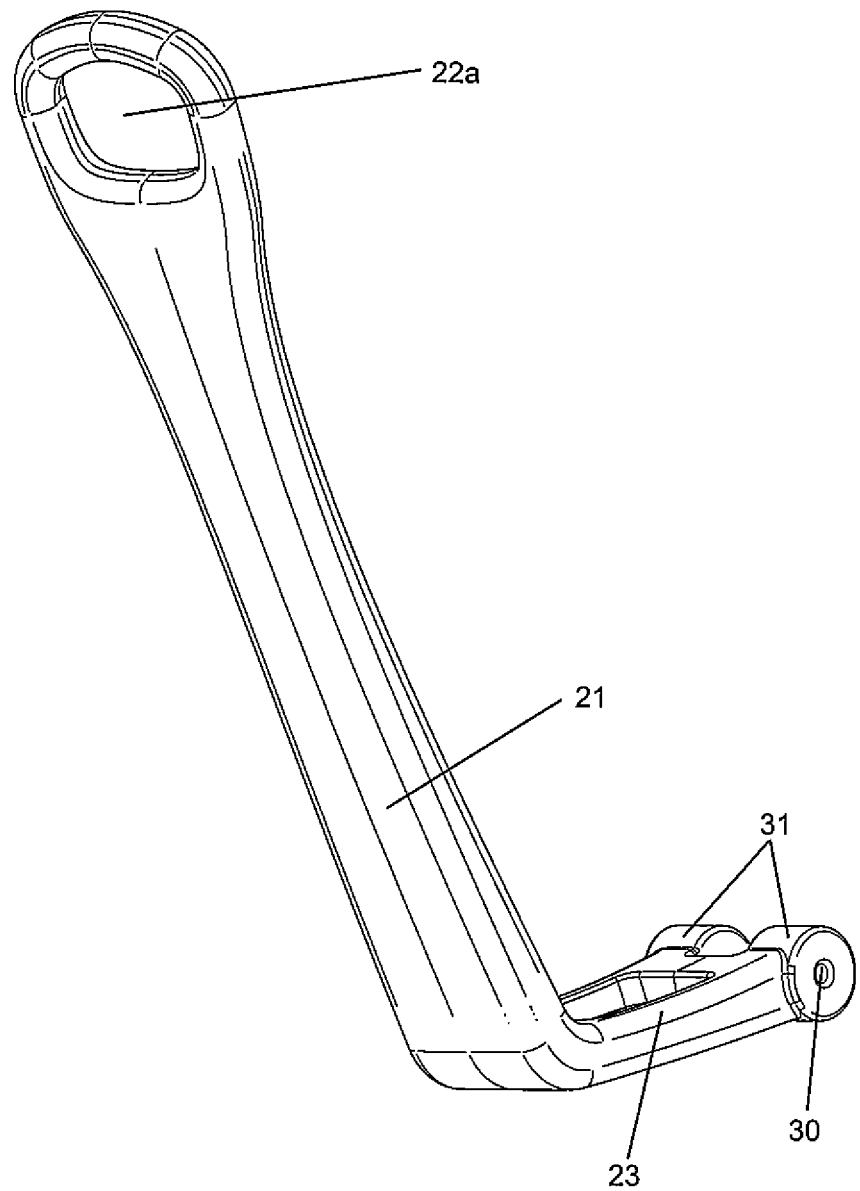
FIG. 44 shows a further embodiment of the handle of FIG. 41.

FIG. 44 shows a further embodiment of the handle assembly 21, 22a, 23. In this embodiment, the shape of the opening 22a is designed to better suit the users' grip. Like the previous embodiment of the handle assembly 21, 22, 23, the wagon is configured to be operatively pulled by a user grasping grip 22a and pulling the handle 21, 23. This connection method to the wagon body 50 enables the handle assembly 21, 22a, 23 as guided and directed by an operator, to be raised and lowered about the handle axle or pin 25 and with which to pull or push the multi-use wagon 10. The opening 22a may have a foam or rubber cover to provide a better more comfortable grip for the user.

Figure 45:
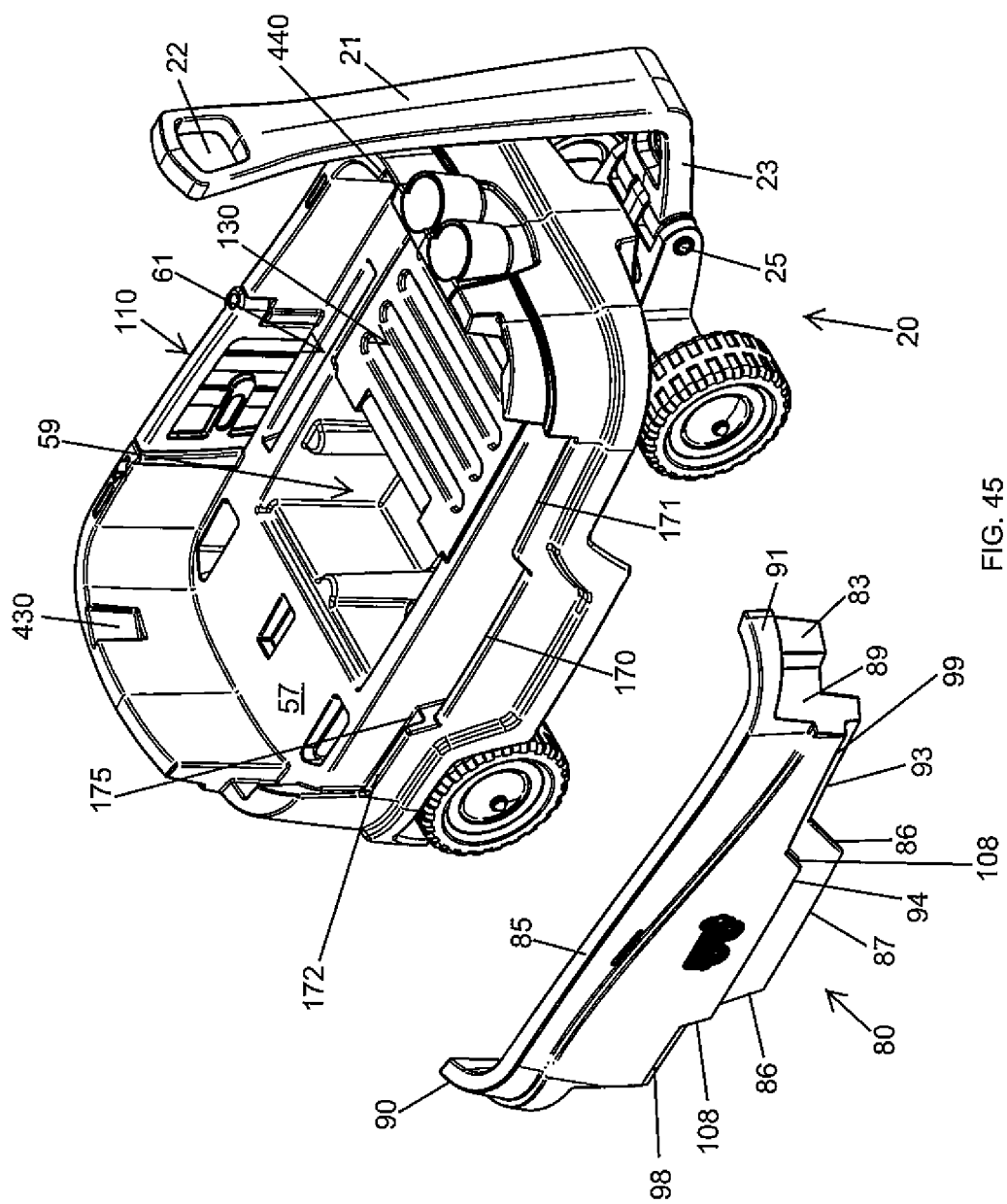
FIG. 45 shows a perspective view of the removable panel removed from the side of the wagon body.
Figure 46:
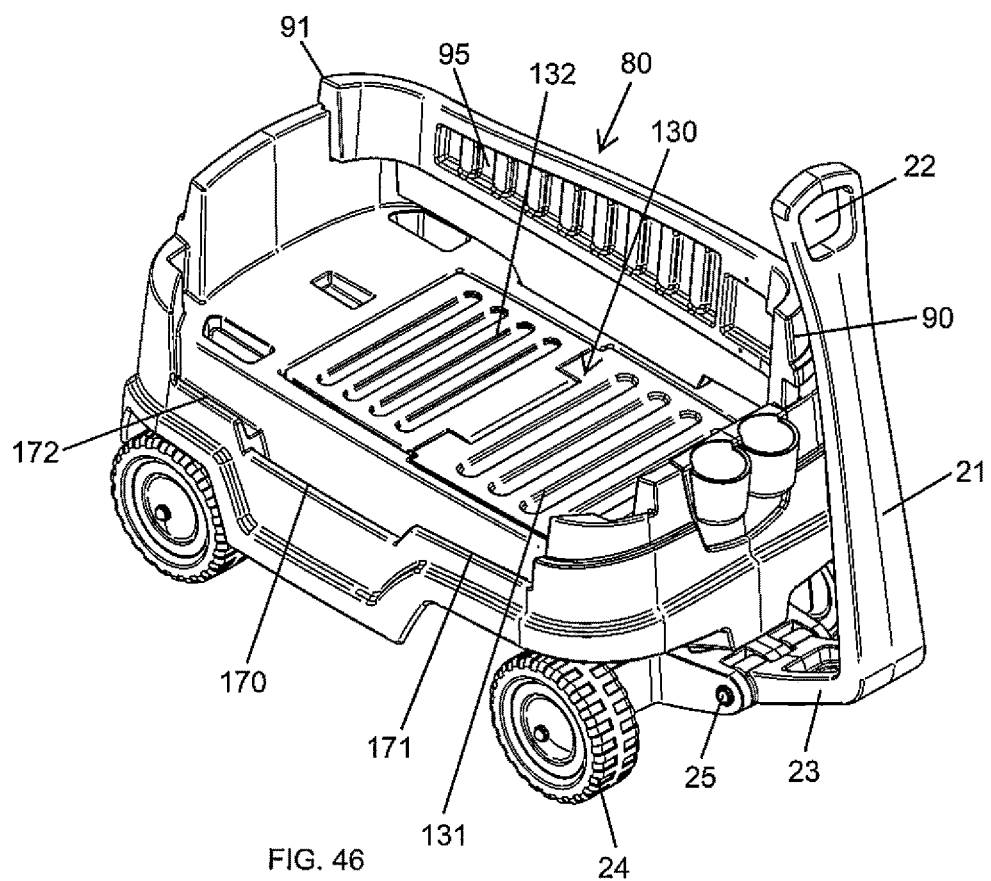
FIGS. 46 and 47 show a perspective view and side view of the removable panel inserted in the floor of the passenger compartment and aligned alongside the opposite side of the body.

FIGS. 45 to 48 illustrate the process of converting the wagon 10 to the configuration of a bench seat. The first step is to remove the panel 80 from the side wall 51. The panel 80 is pulled in an upward direction to release the block shaped projections 82, 83 from their respective sockets 410, 420 and the tab 84 from within the socket 174 as shown in FIG. 45. This figure also illustrates the seating surface 130 in a first configuration located over the first storage compartment 58. The panel 80 is then rotated 180 degrees so that when it is inserted into the socket 61 located adjacent the side wall 54 the inside wall 95 of the panel 80 is now facing the opposite direction as shown in FIG. 46. The leading edge 91 and the projection 83 is inserted into the socket 430 located in the rear wall 53. Likewise, the trailing edge 90 of the panel 80 is inserted into the socket 440 located in the front wall 56. The seat 130 is now extended so that the upper panel 131 covers the front storage compartment 58 and the lower panel 132 covers the rear storage compartment 59. In this orientation a user is able to sit with their back against the rear side 95 of the panel 80 and on top of the expanded seating surface 130. The combined planar floor 57 with the extended seating surface provides a substantially planar bench seat for a child or children to be seated upon.

Figure 47:
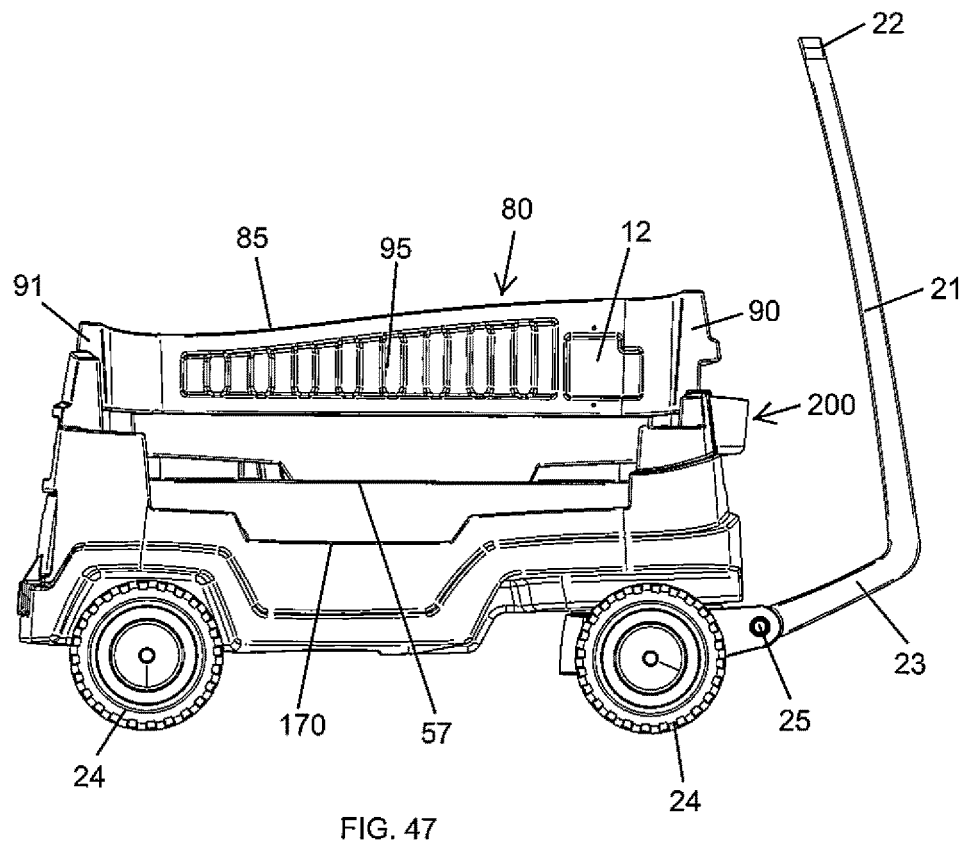
Figure 48:
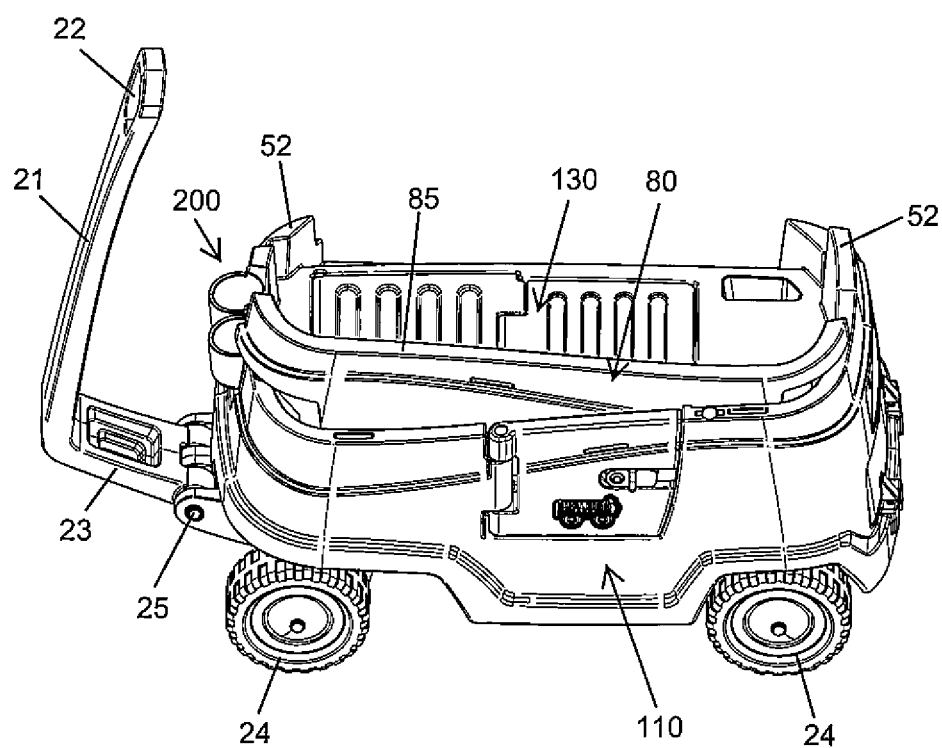
FIG. 48 shows an opposite side view of FIG. 46.

The side walls 51, 54 have a first height in the first configuration of the wagon 10 as shown in FIGS. 1 to 8 where the removable wall panel 80 is connected to the first side wall 51 of the wagon 10. When the removable wall panel 80 is connected to the socket 61 adjacent the second side wall 54 as shown in FIGS. 46 to 48, the second sidewall 54 now has a second height that extends to the top of the removable wall panel 80. As is clear from the figures, the second height is greater than the first height because the wall panel 80 when removed from the wagon and rotated 180 degrees and inserted into the socket 61 raises the height of the side wall 54 as shown in FIG. 48.

Figure 49:
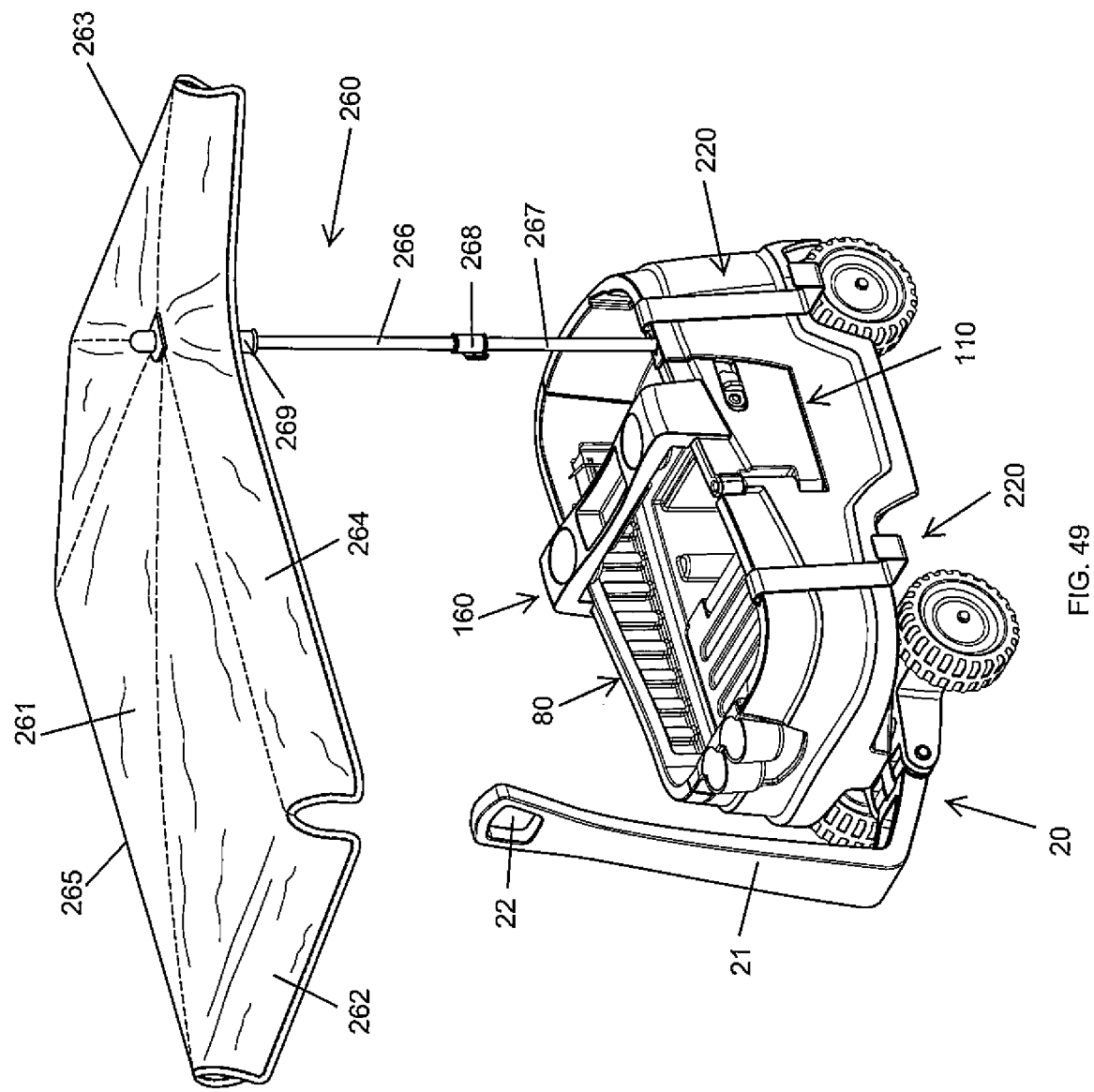
FIGS. 49 and 50 show a perspective view and side view of a removable umbrella in accordance with an embodiment of the present invention.
Figure 50:
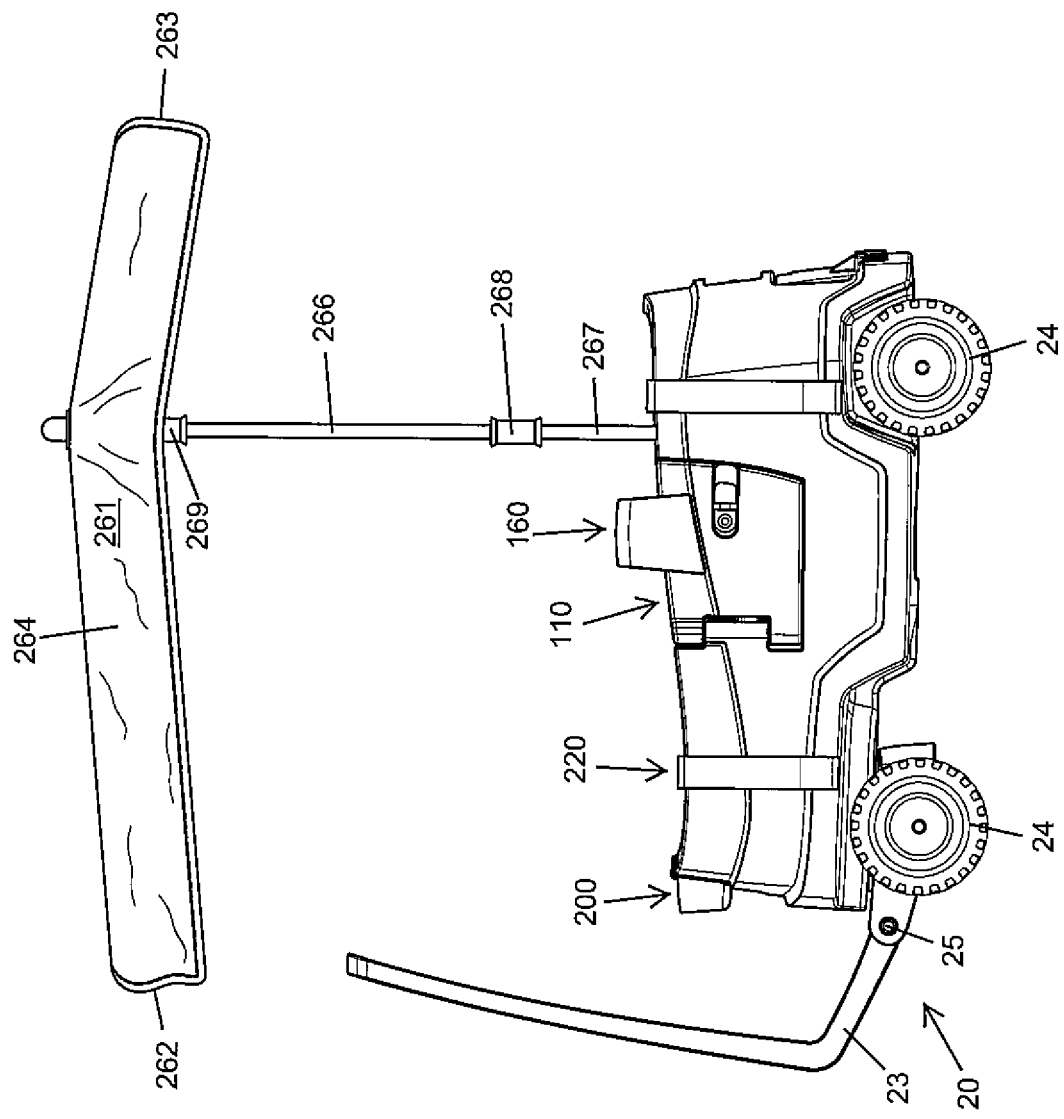
Figure 51:
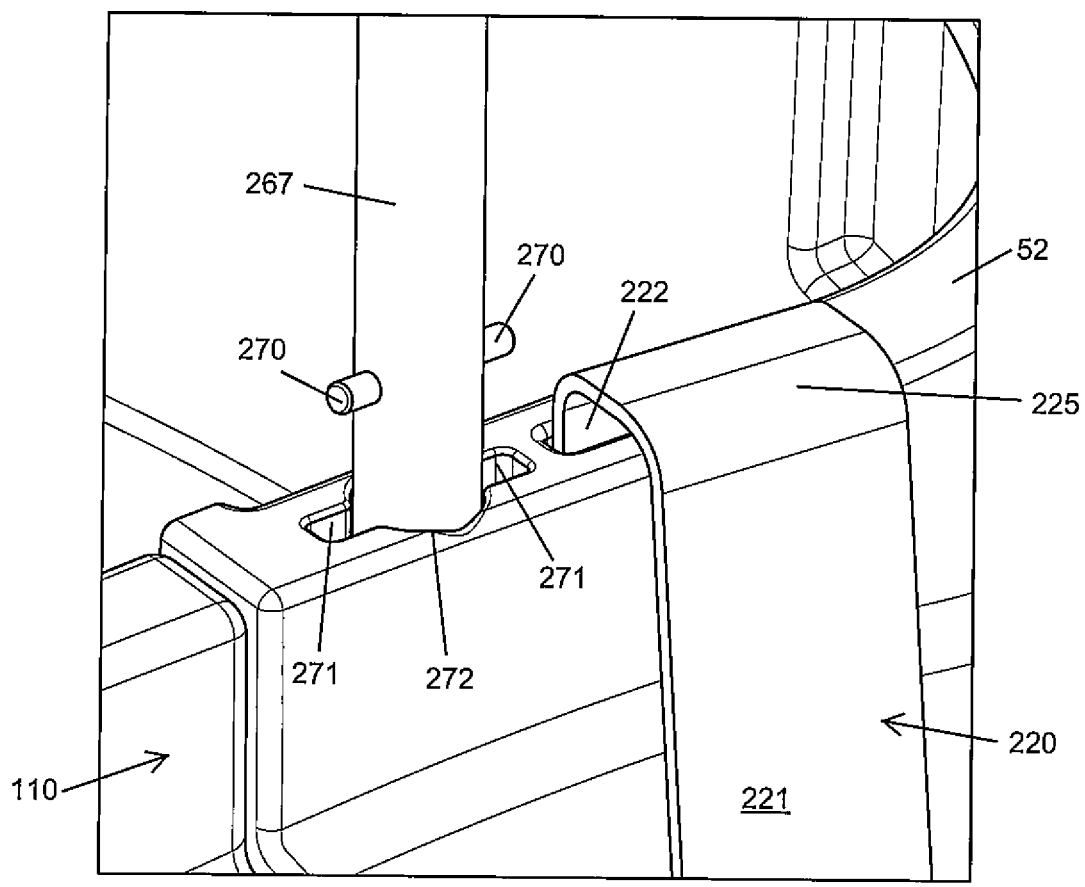
FIG. 51 shows an enlarged view of the umbrella attachment mechanism located within the attachment means on the wagon body.

FIGS. 49 to 51 show a further embodiment of the present invention in which a removable umbrella 260 is installed into the socket 78 located in the side wall 54. The umbrella 260 has a first shaft 267, a second shaft 266 joined to the first shaft 267 by a connector 268. A canopy 261 is attached to the top of shaft 266 by a connector 269. The canopy 261 has a front 262, a rear 263 and opposing sides 264, 265. The umbrella 260 is used to provide protection for children, adolescents and adults when seated within the wagon 10. The canopy 261 can be made from nylon or any plastic material that is not permeable. The shafts 267, 268 are an aluminum shaft which provides a strong but lightweight pole. Alternatively, the poles may be a wood or steel pole.

The shaft 267 has a first end which is attached to the connector 268 and an opposing end which is inserted into the socket 78 in the side wall 54. In order to prevent the shaft 267 and the umbrella 260 from freely rotating within the socket 78, the shaft 267 has a pin 270 extending transversely through the shaft 267 such that when the shaft 267 is inserted into the socket 78 the shaft is received within a circular section 272 and the pin 270 is received within a corresponding transverse section 271 in the side wall 54. The end of the shaft 267 which is inserted into the socket 78 has a tapered end which allows the umbrella 260 to be removed from the wagon 10 and used as a beach umbrella inserted into the sand or other surface.

The wagon body 50, the front wheel assembly 20, the handle assembly 21, 22, 23, the wheels 24, the removable panel 80, the access door 110, the seating surface 130, the accessory tray 160 and the cup holder 200 are preferably all molded from linear low-density polyethylene plastic or similar material. All of the above components are produced using standard molding processes. For example, the components can be formed using a rotational molding process. Rotational molding involves a heated hollow mold which is filled with a charge or shot weight of material. It is then slowly rotated (usually around two perpendicular axes), causing the softened material to disperse and stick to the walls of the mold. In order to maintain even thickness throughout the part, the mold continues to rotate at all times during the heating phase and to avoid sagging or deformation also during the cooling phase.

The axles 36 are preferably manufactured from carbon steel, but other materials could be utilized. The wheel fasteners 37 could be pressed or threaded to the axles 36. The front wheel assembly 20 is attached to the base of the body 50 when the boss 27 is inserted through the rotation hole 68 and restrained in this position.

The front storage compartment 58 in one configuration can be utilized as a cooler for storing items in a temperature moderated climate. In this configuration the walls of the storage compartment 58 may be insulated by interposing material that prevents the loss of heat around the walls. Also in this configuration the drain holes 65 within the floor 64 have a drain plug and cap for closing the apertures 65. The drain cap would be accessible from the bottom side of the wagon body 50.

Advantages

The present invention provides a multipurpose wagon designed which has been designed that can be used by children, adolescents and adults. The multipurpose wagon can be provided with configurable components to allow different uses of the multipurpose wagon. In one configuration, the multipurpose wagon may have one or two seats and a well for placement of feet, allowing passengers to comfortably ride in the multipurpose wagon. In another configuration, a seat may be folded down in flat positions, allowing the wagon to be used as a flat-bed carrier with storage compartments below. Alternatively, in the same configuration the wagon can be used as a bed for a child. In yet a further configuration, a panel may be removed from one side of the multipurpose wagon and inserted into an opposing side floor of the multipurpose wagon, thereby acting as a backrest for a bench seating arrangement of the multipurpose wagon. Such versatility eliminates the need to have several types of wagons or carts, thereby minimizing cost and storage requirements.

The majority of the components of the multipurpose wagon are formed from plastics material which provides for greater flexibility in terms of product design. For example, additional storage spaces, seating and other interior features are molded into the wagon body and the body can be formed to any particular shape desired.

The present invention includes a roof or cover to provide protection for children or objects positioned within the wagon from sunlight or precipitation. The shaft of the umbrella has a device which is received within an aperture in the wall of the wagon which prevents the umbrella from rotating during use. The connection of the cover to the wagon does not require the use of tools in order to assemble or disassemble the cover from the wagon. The positioning of the umbrella within the socket in the side wall means there is no loss of storage area and the umbrella does not pose an obstacle for the children within the wagon. Also, the shape of the umbrella ensures that when the umbrella is extended it does not extend substantially beyond the footprint of the wagon. This means that maneuvering of the wagon can be safely carried out with the umbrella in the extended position.

Likewise, the design of the removable panel, the seating surface and the removable cup holder have all been designed to be located and removed without the use of tools through the innovative use of projections and sockets.

The removable panel is designed to be inserted into a socket adjacent the opposing wall from where it was removed in order to easily store the panel and also provide a back rest when the wagon is being used as a bench seat. It therefore does not take up any storage space and is unlikely to be lost.

Another problem associated with the known wagons is the positioning of the handle when the wagon is not being pulled over the surface. The present invention has a removable cup holder which allows the handle hinged to the front wheel assembly to be pivoted to a position safely located above the wagon body. This avoids the problem of the handle, when not in use, becoming a tripping hazard. The ability to position the handle over the top also makes it easier to lift the wagon into and out of the car boot. This provides an advantage over the known wagons in that the handle is not required to be disassembled from the wagon for storage purposes. The position of the handle within the aperture of the cup holder also provides a simple wheel lock for the wagon. In this position the wheels cannot be pivoted around the front of the body. The position of the handle does not require the user to hold it in place while the wagon is being carried as it will remain in position above the floor of the wagon.

The design of the $5^{th}$ wheel style steering of the present invention provides a wagon which can be more precisely maneuvered in tight spaces. By providing a front steering assembly which has wheels which can be pivoted and rotated around the connection to the base provides this maneuverability.

The removable panel which allows the wagon to be used in one configuration as a bench seat means that the design of the body unit only has one removable wall. Most similar wagons have four separate removable walls which need to be stored when not being used. The present invention provides a storage position within the floor of the body which doubles as the backrest for the bench seat. This means the likelihood of losing parts is reduced and also not having as many movable parts also reduces any chance of vibrational noise when the wagon is being pulled or pushed over a surface.

Variations

It will be realized that the foregoing has been given by way of illustrative example only and that all other modifications and variations as would be apparent to persons skilled in the art are deemed to fall within the broad scope and ambit of the invention as herein defined in the appended claims.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A multipurpose wagon comprising:
   a wagon body having an upstanding perimeter wall defined by a bottom portion, a front portion, a rear portion, a first side portion and a second side portion;
   a rear wheel assembly rotatably coupled to the bottom portion and located adjacent the rear portion of the body;
   a front wheel assembly pivotally and rotatably coupled to the bottom portion and located adjacent the front portion of the body;
   a handle assembly pivotally coupled to the front wheel assembly, the handle assembly allowing a user to push or pull the wagon and rotate the front wheel assembly in an arc relative to the body to provide a steering effect to the wagon;
   a passenger compartment with a planar floor defined within the upstanding perimeter wall of the body;
   a door hingedly coupled to the second side portion of the wagon body, the door being selectively movable between an open and a closed position to allow user access to the passenger compartment;
   a first seating surface defined in the planar floor and extending from the rear portion of the wagon;
   a storage compartment with a planar base located beneath the passenger compartment, the storage compartment forming a first and a second discrete storage compartments separated by a partition wall upwardly extending from the planar base;
   a second seating surface removably coupled to the planar floor of the passenger compartment and located over the first storage compartment, the second seating surface being adapted for opening to provide access to the first storage compartment;
   a removable wall panel located within the first side portion of the body;
   wherein the second storage compartment provides a foot well for a child or children seated on the first, second or both seating surfaces; and
   wherein when the removable wall panel is disconnected from the first side portion, the wall panel is repositioned to sit within respective apertures located in the planar floor of the passenger compartment and within the second side portion of the wagon body to form a backrest to support a child sitting within the wagon.

2. A multipurpose wagon as claimed in claim 1, wherein the storage compartment has a top edge with a ledge located therein and extending around a periphery of the storage compartment and located beneath the planar floor of the passenger compartment, the ledge having a pair of apertures located within opposing side walls and adjacent a front wall of the storage compartment, wherein the apertures are adapted to receive a locating member of the second seating surface.

3. A multipurpose wagon as claimed in claim 2, wherein the partition has a top edge with an aperture for receiving a side portion of the second seating surface therein, and a plurality of mounting pads are located around the periphery of the storage compartment, the mounting pads are adapted to receive a portion of the second seating surface thereon so that in use a top surface of the second seating surface sits flush with the planar floor of the passenger compartment.

4. A multipurpose wagon as claimed in claim 3, wherein the second seating surface further comprises an upper panel, a lower panel, and a pivot means mounted to one end of the upper panel to pivotally connect the lower panel to the upper panel, wherein in a folded position the upper panel and the lower panel are juxtaposed with each other, and the second seating surface is formed by locating the lower surface within the ledge and on the mounting pads of the first storage compartment and the upper surface sits flush with the planar floor of the passenger compartment.

5. A multipurpose wagon as claimed in claim 4, wherein the upper panel has a first end with a pair of locating tabs located on opposing sides of the upper panel, the locating tabs being received within the pair of apertures located within opposing side walls of the storage compartment, the locating tabs located within the pair of apertures allow the second seating surface to be rotated to open and close the first storage compartment.

6. A multipurpose wagon as claimed in claim 5, wherein the pivot means located at one end of the second seating surface is located within the aperture in the top edge of the partition of the storage compartment, and when the upper and lower panels are pivoted to an expanded position, the upper and lower panels are located in a common horizontal plane and form a planar surface with the floor of the passenger compartment and are adapted to be inserted over the first and second storage compartments to form a flat-bed wagon.

7. A multipurpose wagon as claimed in claim 1, wherein the handle assembly further comprises an outwardly extending elongate lever arm having a first end and a second end, the first end being pivotally coupled to the front wheel assembly, the second end having an opening configured for grasping by a person for pulling or pushing the multipurpose wagon.

8. A multipurpose wagon as claimed in claim 7, wherein the front wheel assembly further comprises:
   a housing with a top and a bottom surface, the handle assembly is pivotally connected to the housing of the front wheel assembly;
   a first axle having a longitudinal axis coupled to the bottom surface of the housing;
   a wheel rotatably coupled to each end of the first axle;
   a boss extending from the top surface of the housing, the boss having an end secured within an opening in the planar base of the storage compartment; and a circular raised surface circumscribing the boss to allow the housing assembly to be pivoted relative to the bottom portion of the body around the boss; and wherein the rear wheel assembly comprises:
   a second axle having a longitudinal axis coupled to the bottom portion at a Junction defined by the bottom portion and the rear portion of the body; and
   a wheel rotatably coupled to each end of the second axle.

9. A multipurpose wagon as claimed in claim 8, wherein each rear wheel is located within an indentation in the wagon body, the indentations defining wheel wells for substantially receiving each rear wheel therein.

10. A multipurpose wagon as claimed in claim 1, wherein the passenger compartment defined within the upstanding perimeter wall has a top surface extending around the perimeter of the wagon body, the top surface located within the second side portion has a plurality of receiving slots adapted as engagement means for retaining objects to the wagon, and one of the plurality of receiving slots has a longitudinally extending socket extending from the top surface of the second side portion to approximately the bottom portion of the wagon body, the socket has a second slot extending outwardly from each side of the socket and running parallel to the top surface of the second side portion, the second receiving slot extending for a pre-determined distance from the top surface of the second side portion.

11. A multipurpose wagon as claimed in claim 10, wherein the receiving slot is adapted to receive a shaft of a collapsible umbrella and the second slot is adapted to receive a locking pin extending transversely through the shaft of the umbrella, the locking pin engaging with the second slot to prevent the rotation of the umbrella shaft within the receiving slot.

12. A multipurpose wagon as claimed in claim 1, wherein the front portion of the passenger compartment has a centrally located aperture for receiving a removable cup holder.

13. A multipurpose wagon as claimed in claim 12, wherein the cup holder comprises:
   a top wall with at least one receptacle for receiving a cup therein;
   a bottom wall and opposing side walls;
   a recess formed around the bottom wall and opposing side walls; and
   wherein the aperture in the front portion has a tab extending around the periphery of the aperture for receiving therein the recess formed around the bottom wall and the side walls of the cup holder, and when the cup holder is removed from the aperture within the front portion a section of the handle assembly pivotally attached to the front wheel assembly of the wagon can be pivoted to a position substantially located above and over the planar floor of the passenger compartment.

14. A multipurpose wagon as claimed in claim 1, wherein the removable panel comprises a leading edge, a trailing edge, a top surface, a bottom surface, and a tab extending from the bottom surface of the panel, the tab being received within a socket located within the first side portion of the wagon body, and wherein the front portion and the rear portion each comprises a first side edge and a second side edge.

15. A multipurpose wagon as claimed in claim 14, wherein the leading edge of the removable panel has a first locating projection, the first locating projection is sized to be received within a socket located in the first side edge of the front portion, the trailing edge of the removable panel has a second locating projection, the second locating projection is sized to be received within a socket located in the first side edge of the rear portion, and the planar floor of the passenger compartment has a socket therein located adjacent and running parallel with the second side portion of the wagon, the socket is sized and shaped to receive the tab extending from the bottom surface of the removable panel.

16. A multipurpose wagon as claimed in claim 15, wherein when the removable panel is detached from the first side portion of the wagon and the tab extending from the bottom surface of the panel is inserted into the socket of the planar floor of the passenger compartment on the second side portion, the leading edge of the removable panel and the first locating projection is inserted into a socket located in the second side edge of the rear portion and the trailing edge of the removable panel and the second locating projection is inserted into a socket located in the second side edge of the front portion.

17. A multipurpose wagon as claimed in claim 16, wherein the first and second locating projections form a releasable friction fit with the sockets located in the first and second side edges of the front and rear portions, and the tab of the removable panel forms a releasable friction fit with the socket of the planar floor of the passenger compartment and the socket located within the first side portion.

18. A multipurpose wagon as claimed in claim 17, wherein the second side portion has a first height in a first configuration of the wagon, and wherein the second side portion has a second height when the removable panel is connected to the opening adjacent the second side portion in a second configuration, the second height being greater than the first height.

19. A multipurpose wagon as claimed in claim 18, wherein in the first configuration a flat-bed wagon or a bed wagon is formed with the second seating surface opened to cover the first and the second storage compartments, and a bench seat is formed in the second configuration with the second seating surface opened to cover the first and the second storage compartments and the removable panel forms a backrest for the bench seat.

20. A multipurpose wagon comprising:
   a wagon body having an upstanding perimeter wall defined by a bottom portion, a front portion, a rear portion, a first side portion and a second side portion;
   a passenger compartment with a planar floor defined within the upstanding perimeter wall;
   a first seating surface defined in the planar floor and extending from the rear portion of the wagon body;
   a storage compartment located beneath the passenger compartment, the storage compartment having a planar base, a front wall, a back wall, opposing side walls and a partition upwardly extending from the base and interconnecting the opposing side walls to form a first and a second discrete storage compartment;

a second seating surface removably coupled to the planar floor over the first storage compartment, the second seating surface being adapted for opening to provide access to the first storage compartment;

a rear wheel assembly rotatably coupled to the bottom portion and located adjacent the rear portion of the body, the rear wheel assembly comprises a rear axle having a longitudinal axis coupled to the bottom portion at a junction defined by the bottom portion and the rear portion of the body, and a wheel rotatably coupled to each end of the rear axle;

a front wheel assembly pivotally and rotatably coupled to the bottom portion and located adjacent the front portion of the body, the front wheel assembly comprises a housing with a top and a bottom surface, a front axle having a longitudinal axis coupled to the bottom surface of the housing, a wheel rotatably coupled to each end of the front axle, and a boss extending from the top surface of the housing, the boss having an end secured within an opening in the planar base of the storage compartment, and a circular raised surface circumscribing the boss to allow the housing assembly to be pivoted relative to the bottom portion of the body around the boss;

a handle assembly pivotally coupled to the housing of the front wheel assembly to allow a user to push or pull the multipurpose wagon and rotate the front wheel assembly in an arc relative to the body to provide a steering effect to the wagon;

a removable wall panel located within the first side portion of the wagon body, the removable panel when removed from the first side portion is connectable to a socket in the planar floor of the passenger compartment and located adjacent to the second side portion of the wagon body; and a removable cup holder located within a centrally located aperture of the front portion, when the cup holder is removed from the aperture within the front portion a section of the handle assembly pivotally attached to the front wheel assembly of the wagon can be pivoted to a position substantially located above and over the planar floor of the passenger compartment.

* * * * *